(12) United States Patent
Kayama et al.

(10) Patent No.: US 12,133,011 B1
(45) Date of Patent: Oct. 29, 2024

(54) PHOTOELECTRIC CONVERSION DEVICE AND PHOTODETECTION SYSTEM

(71) Applicant: CANON KABUSHIKI KAISHA, Tokyo (JP)

(72) Inventors: Kazuya Kayama, Tokyo (JP); Satoshi Omodani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/626,926

(22) Filed: Apr. 4, 2024

(30) Foreign Application Priority Data

Apr. 25, 2023 (JP) ................................ 2023-071302

(51) Int. Cl.
| | |
|---|---|
| H04N 5/351 | (2011.01) |
| G01S 7/48 | (2006.01) |
| G01S 7/481 | (2006.01) |
| G01S 7/4861 | (2020.01) |
| G01S 7/4863 | (2020.01) |
| G01S 17/931 | (2020.01) |
| H04N 25/771 | (2023.01) |
| H04N 25/773 | (2023.01) |
| H04N 25/78 | (2023.01) |
| G01S 17/89 | (2020.01) |

(52) U.S. Cl.
CPC ......... *H04N 25/773* (2023.01); *G01S 7/4808* (2013.01); *G01S 7/4863* (2013.01); *G01S 17/931* (2020.01); *H04N 25/771* (2023.01); *H04N 25/78* (2023.01); *G01S 17/89* (2013.01)

(58) Field of Classification Search
CPC .. H04N 25/771; H04N 25/772; H04N 25/773; H04N 25/779; H04N 25/77; H04N 25/76; H04N 25/78; H01L 27/146; H01L 27/14601; H01L 27/14609; H01L 27/14643; G01S 17/88; G01S 17/89; G01S 17/894; G01S 17/93; G01S 17/931; G01S 17/933; G01S 7/48; G01S 7/4804; G01S 7/4808; G01S 7/483; G01S 7/486; G01S 7/4861; G01S 7/4863; G01S 7/4865

See application file for complete search history.

(56) References Cited

U.S. PATENT DOCUMENTS

| | | | | |
|---|---|---|---|---|
| 11,029,200 B2 * | 6/2021 | Mellot | .................. | G01J 1/4204 |
| 11,330,687 B2 * | 5/2022 | Krattiger | ................ | H05B 45/10 |

(Continued)

FOREIGN PATENT DOCUMENTS

| | | |
|---|---|---|
| JP | 2023-39400 A | 3/2023 |
| JP | 2023-76345 A | 6/2023 |

*Primary Examiner* — John R Lee
(74) *Attorney, Agent, or Firm* — VENABLE LLP

(57) ABSTRACT

A photoelectric conversion device includes a photoelectric conversion unit configured to output a photon detection signal in response to an incidence of a photon, a counting unit configured to count the photon detection signal output from the photoelectric conversion unit, and a counting control unit configured to control a counting operation in the counting unit. The counting control unit is configured to reset a count value and restart the counting operation from an initial value, when a count value from a start of the counting operation to a first time is less than a first threshold value and a count value from the start of the counting operation to a second time after the first time is equal to or greater than a second threshold value greater than the first threshold value.

18 Claims, 17 Drawing Sheets

(56) References Cited

U.S. PATENT DOCUMENTS

| | | | | |
|---|---|---|---|---|
| 11,415,458 | B2* | 8/2022 | Ota | G01C 11/00 |
| 11,843,890 | B2* | 12/2023 | Numata | H04N 25/74 |
| 11,881,165 | B2* | 1/2024 | Pyun | G09G 3/3233 |
| 11,937,006 | B2* | 3/2024 | Tojima | H01L 31/02027 |
| 2008/0203309 | A1* | 8/2008 | Frach | G01T 1/2985 |
| | | | | 250/362 |
| 2008/0290259 | A1* | 11/2008 | Mathewson | H04N 25/773 |
| | | | | 250/214 R |
| 2012/0075615 | A1* | 3/2012 | Niclass | G01S 7/4816 |
| | | | | 356/5.01 |
| 2017/0187939 | A1* | 6/2017 | Kasuga | H04N 25/773 |
| 2018/0343406 | A1* | 11/2018 | Ikedo | H04N 25/771 |
| 2021/0051279 | A1 | 2/2021 | Tochigi | |
| 2021/0409625 | A1 | 12/2021 | Zhu | |
| 2022/0236420 | A1* | 7/2022 | Maekawa | H04N 25/773 |
| 2022/0357198 | A1* | 11/2022 | Ota | G01J 1/44 |
| 2023/0217137 | A1* | 7/2023 | Mikajiri | H04N 25/77 |
| | | | | 257/186 |
| 2024/0171872 | A1* | 5/2024 | Mohajerani | H04N 25/78 |

* cited by examiner

RECOUNT NECESSITY DETERMINATION AT TIME T1

| INPUT 1 (Mem1 OUTPUT) | INPUT 2 (Mem2 OUTPUT) | OUTPUT | DETERMINATION |
|---|---|---|---|
| 0 | 0 | 0 | NOT RECOUNT |
| 0 | 1 | 1 | CANNOT OCCUR |
| 1 | 0 | 1 | NOT RECOUNT |
| 1 | 1 | 0 | RECOUNT |

RECOUNT NECESSITY DETERMINATION AT TIME T2

| INPUT 1 (Mem1 OUTPUT) | INPUT 2 (Mem2 OUTPUT) | OUTPUT | DETERMINATION |
|---|---|---|---|
| 0 | 0 | 0 | NOT RECOUNT |
| 0 | 1 | 1 | CANNOT OCCUR |
| 1 | 0 | 1 | NOT RECOUNT |
| 1 | 1 | 0 | RECOUNT |

PHOTOELECTRIC CONVERSION DEVICE AND PHOTODETECTION SYSTEM

BACKGROUND

Field

The present invention relates to a photoelectric conversion device and a photodetection system.

Description of the Related Art

A single photon avalanche diode (SPAD) is known as a detector capable of detecting weak light at a single photon level. The SPAD amplifies signal charge excited by a photon several times to several million times by using an avalanche multiplication phenomenon generated by a strong electric field induced in a p-n junction of a semiconductor. By converting a current generated by the avalanche multiplication phenomenon into a pulse signal and counting the number of pulse signals, the number of incident photons may be directly measured.

Japanese Patent Application Laid-Open No. 2023-039400 discloses a photoelectric conversion device which executes a combination of a recharging method in which the SPAD is periodically recharged and a method in which the counting operation is performed in an accumulation time corresponding to the brightness of an object for each pixel. According to the photoelectric conversion device described in Japanese Patent Application Laid-Open No. 2023-039400, the dynamic range may be enlarged and the power consumption may be reduced.

However, in the photoelectric conversion device described in Japanese Patent Application Laid-Open No. 2023-039400, a flicker phenomenon may occur in the case of photographing a light source such as a fluorescent lamp or an LED traffic signal which periodically repeats turning on and off.

SUMMARY

An object of the present invention is to provide a photoelectric conversion device capable of effectively suppressing the occurrence of flicker.

According to an embodiment of the present disclosure, there is provided a photoelectric conversion device including a photoelectric conversion unit configured to output a photon detection signal in response to an incidence of a photon, a counting unit configured to count the photon detection signal output from the photoelectric conversion unit, and a counting control unit configured to control a counting operation in the counting unit, wherein the counting control unit is configured to reset a count value and restart the counting operation from an initial value, when a count value from a start of the counting operation to a first time is less than a first threshold value and a count value from the start of the counting operation to a second time after the first time is equal to or greater than a second threshold value greater than the first threshold value.

According to another embodiment of the present disclosure, there is provided a photoelectric conversion device including a photoelectric conversion unit configured to output a photon detection signal in response to an incidence of a photon, a counting unit configured to count the photon detection signal output from the photoelectric conversion unit, and a counting control unit configured to control a counting operation in the counting unit, wherein the counting control unit includes a first memory configured to hold a result of comparison between a count value from a start of the counting operation to a first time and a first threshold value, a second memory configured to hold a result of comparison between a count value from the start of the counting operation to a second time after the first time and the first threshold value, and a third memory configured to hold a result of comparison between a count value from the start of the counting operation to the second time and a second threshold value greater than the first threshold value, and wherein the counting control unit is configured to control the counting operation based on information held in the first memory, the second memory, and the third memory.

Further features of the present invention will become apparent from the following description of exemplary embodiments with reference to the attached drawings.

DESCRIPTION OF THE EMBODIMENTS

Figure 1:
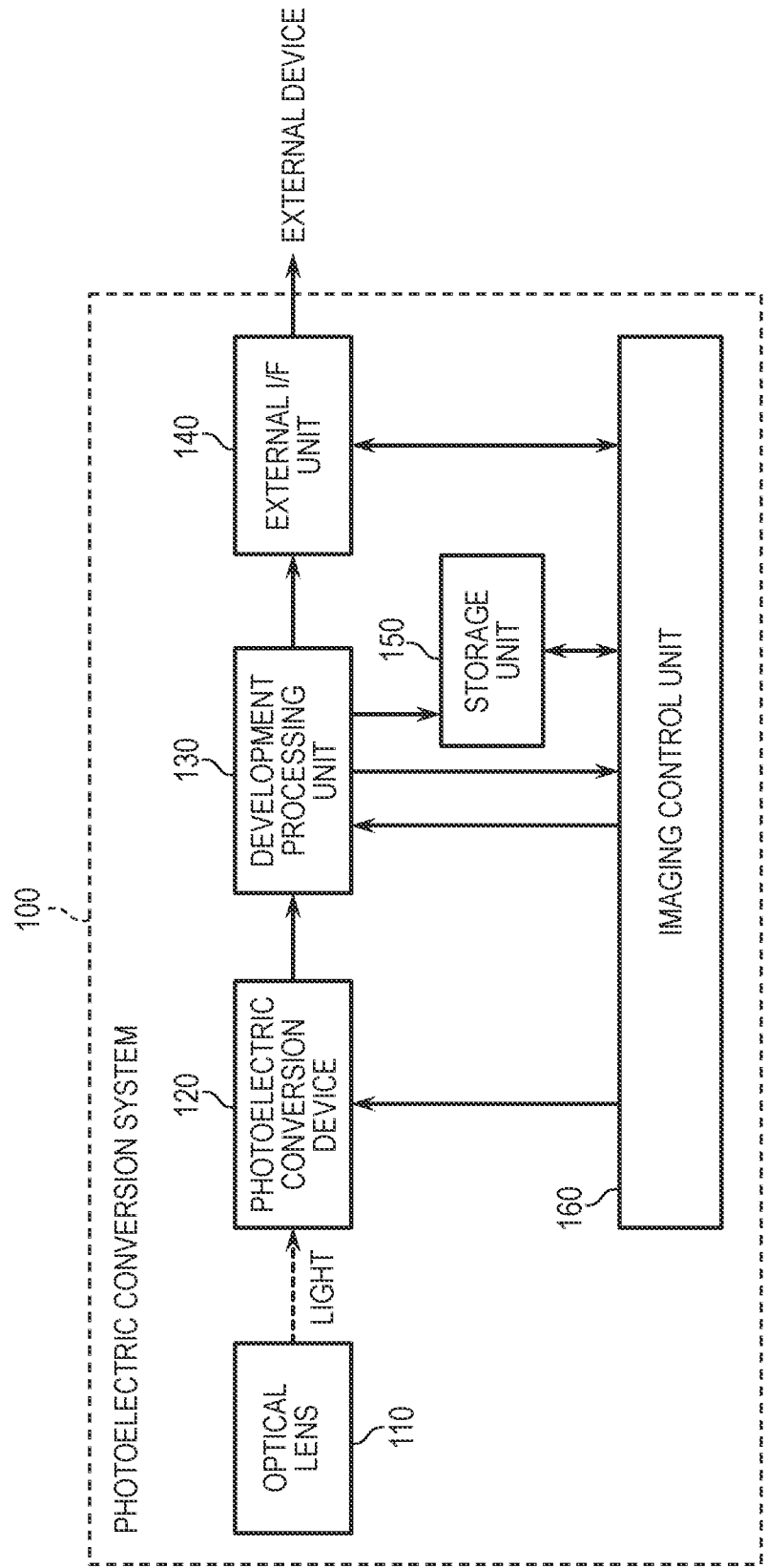
FIG. 1 is a block diagram illustrating a schematic configuration of a photoelectric conversion system according to a first embodiment of the present invention.

Preferred embodiments of the present invention will now be described in detail in accordance with the accompanying drawings. The following embodiments are intended to embody the technical idea of the present invention and do not limit the present invention. The sizes and positional relationships of the members illustrated in the drawings may be exaggerated for clarity of explanation. In the following description, the same components are denoted by the same reference numerals, and description thereof may be omitted.

First Embodiment

A photoelectric conversion system according to a first embodiment of the present invention will be described with reference to FIG. 1 to FIG. 11.

Figure 2:
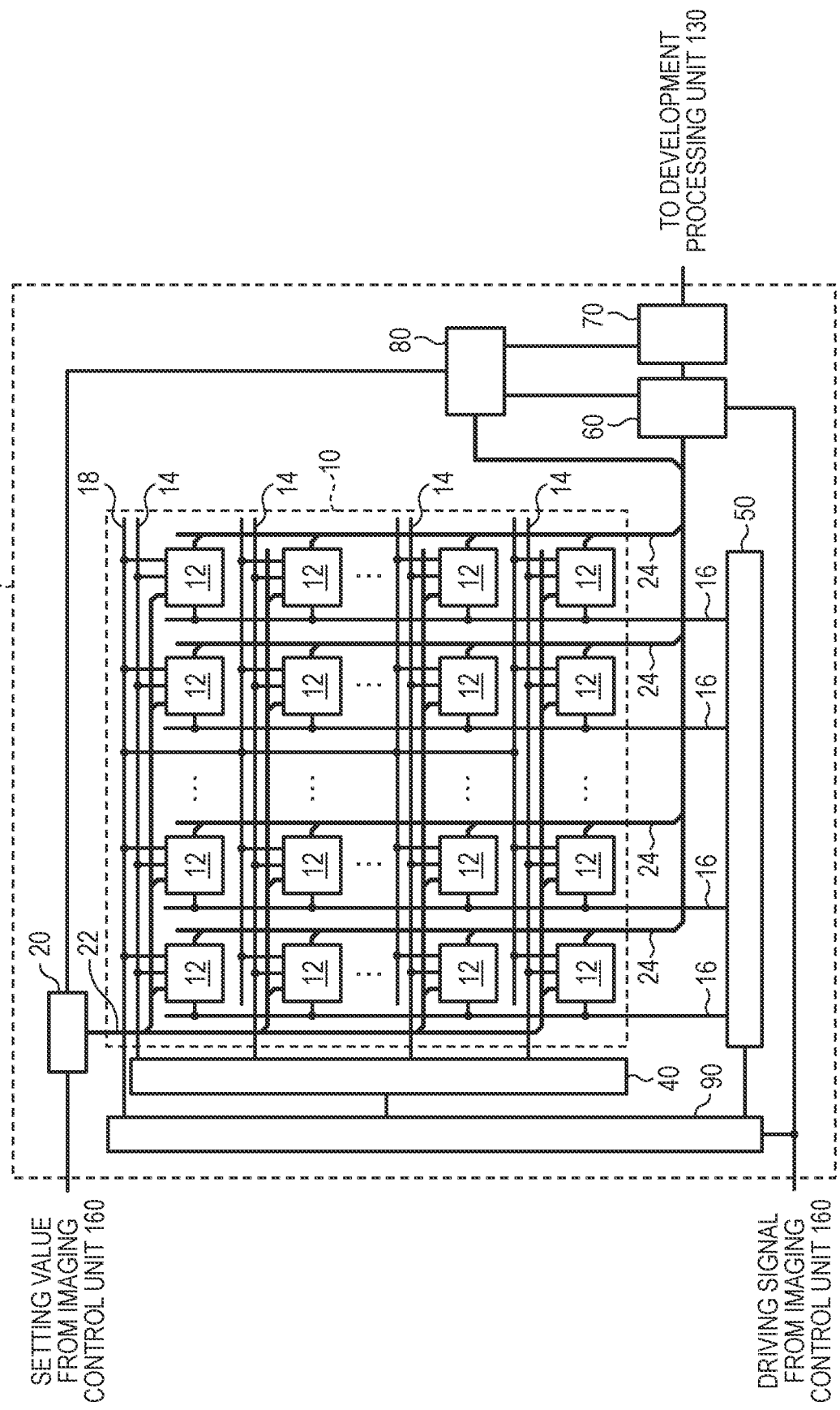
FIG. 2 is a block diagram illustrating a schematic configuration of the photoelectric conversion device according to the first embodiment of the present invention.
Figure 3:
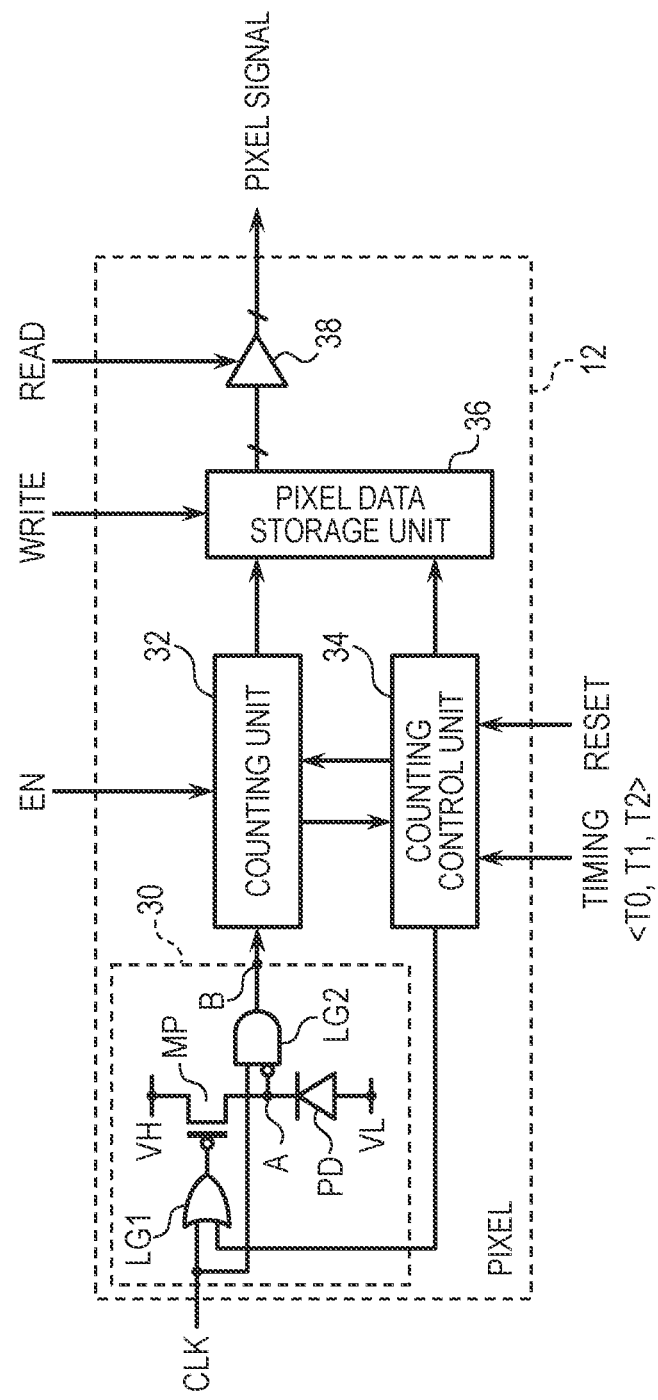
FIG. 3 is a block diagram illustrating a configuration example of a pixel in the photoelectric conversion device according to the first embodiment of the present invention.
Figure 4:
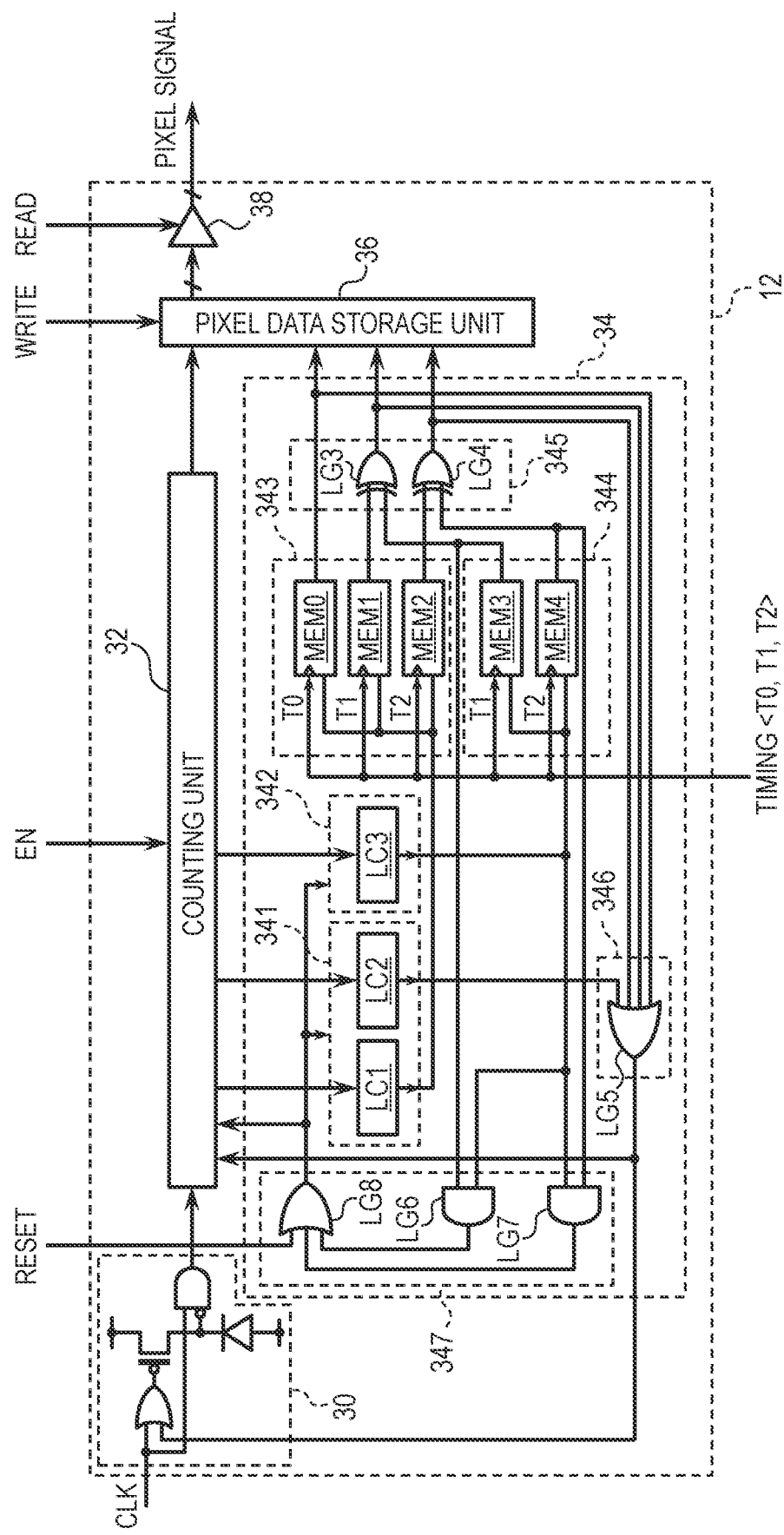
FIG. 4 is a block diagram illustrating a configuration example of a counting control unit in the photoelectric conversion device according to the first embodiment of the present invention.
Figure 5:
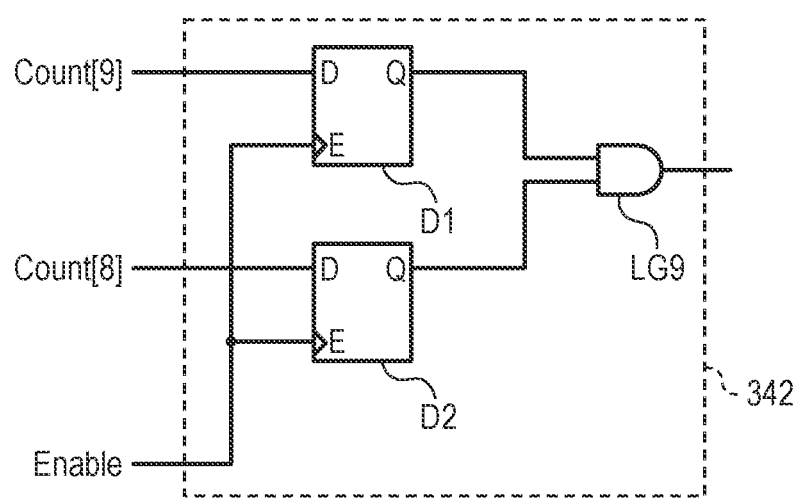
FIG. 5 is a block diagram illustrating a configuration example of a comparison unit in the photoelectric conversion device according to the first embodiment of the present invention.
Figure 6:
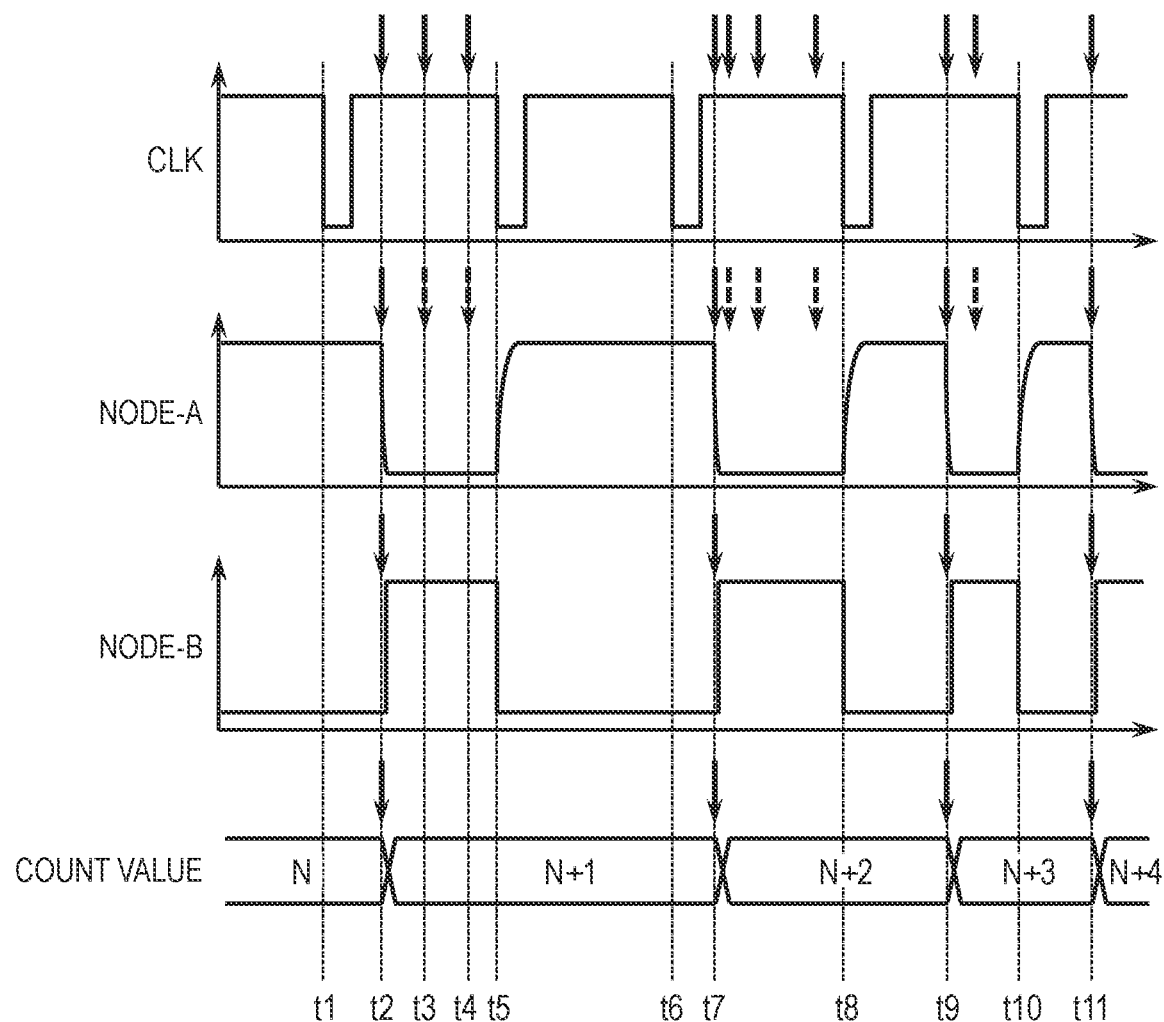
FIG. 6 is a timing chart illustrating an operation of the photoelectric conversion unit and the counting unit in the photoelectric conversion device according to the first embodiment of the present invention.
Figures 7, 8A, 8B:
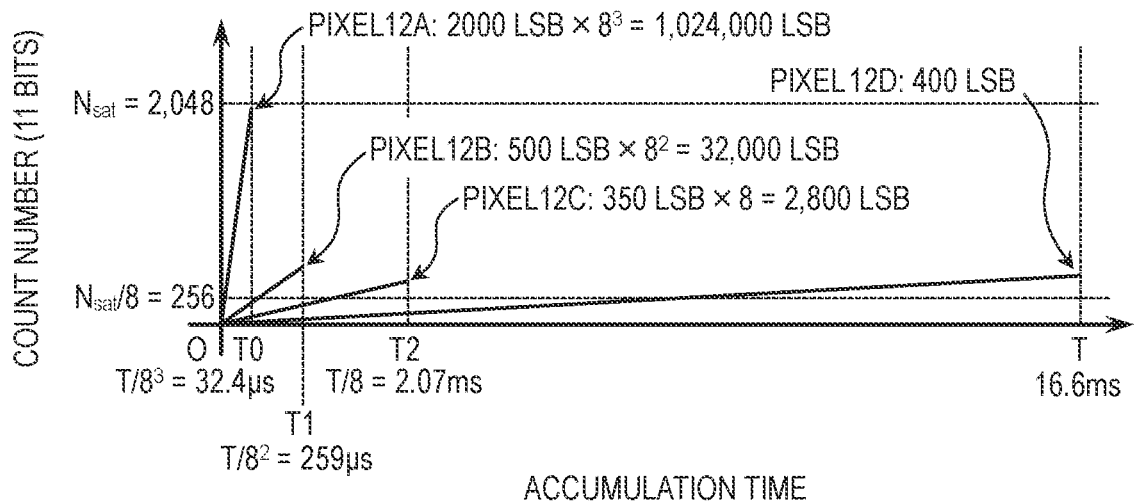
FIG. 7 is a graph illustrating a relationship between a count value and an accumulation time.
FIG. 8A and FIG. 8B are diagrams illustrating criteria for determining whether or not recounting is necessary in the photoelectric conversion device according to the first embodiment of the present invention.
Figure 9:
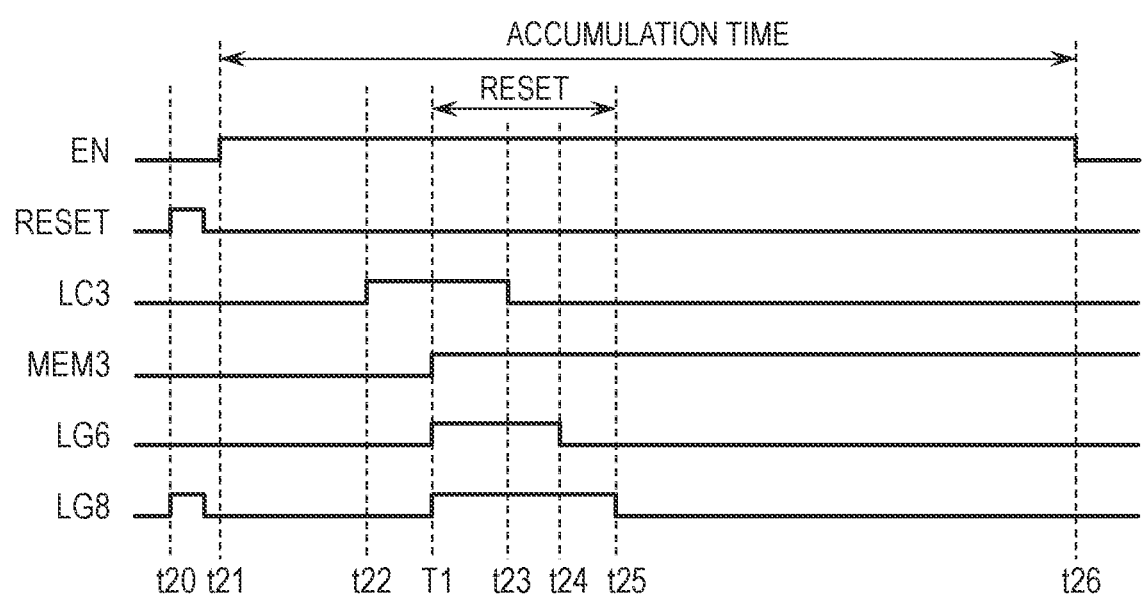
FIG. 9 is a timing chart illustrating a recount operation in the photoelectric conversion device according to the first embodiment of the present invention.
Figure 10:
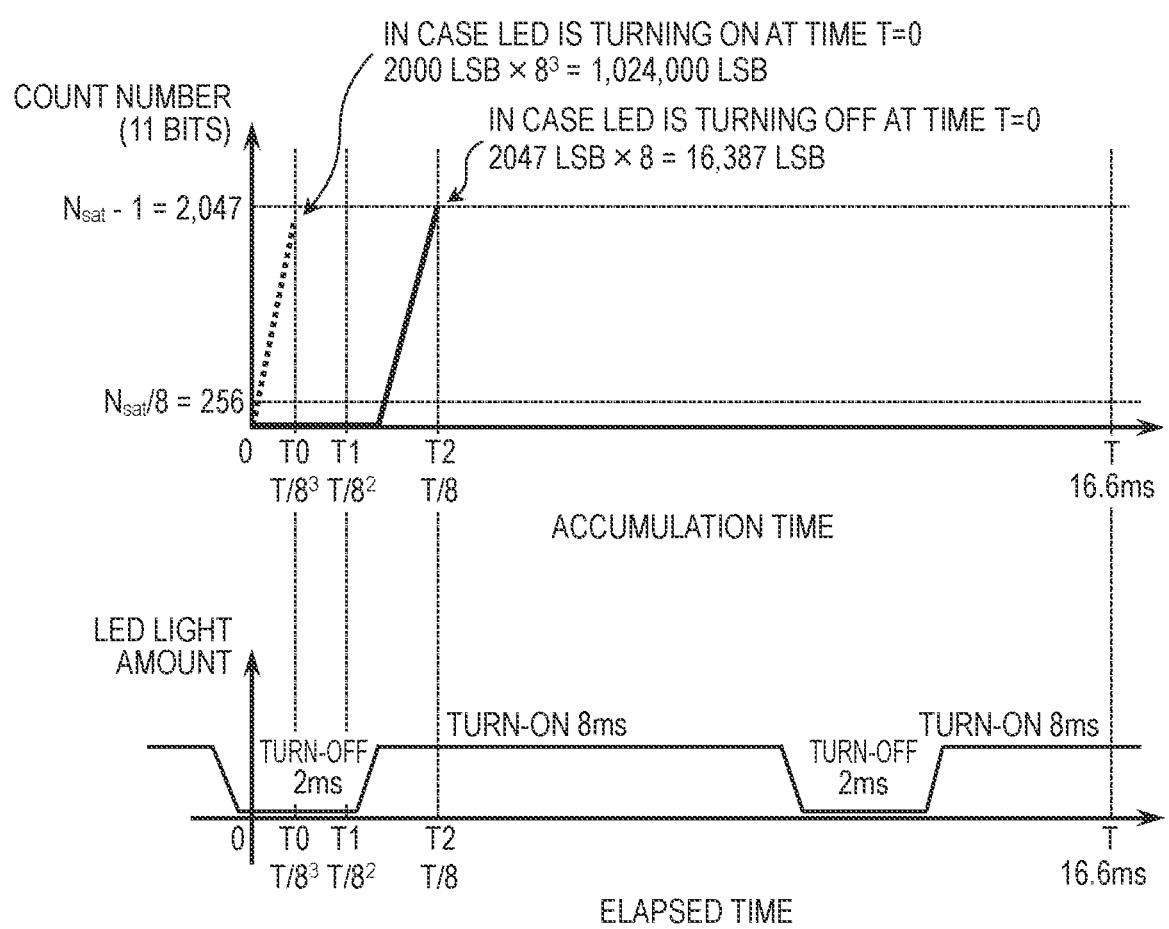
FIG. 10 is a timing chart illustrating an operation of the photoelectric conversion device using the PWEC method.
Figure 11:
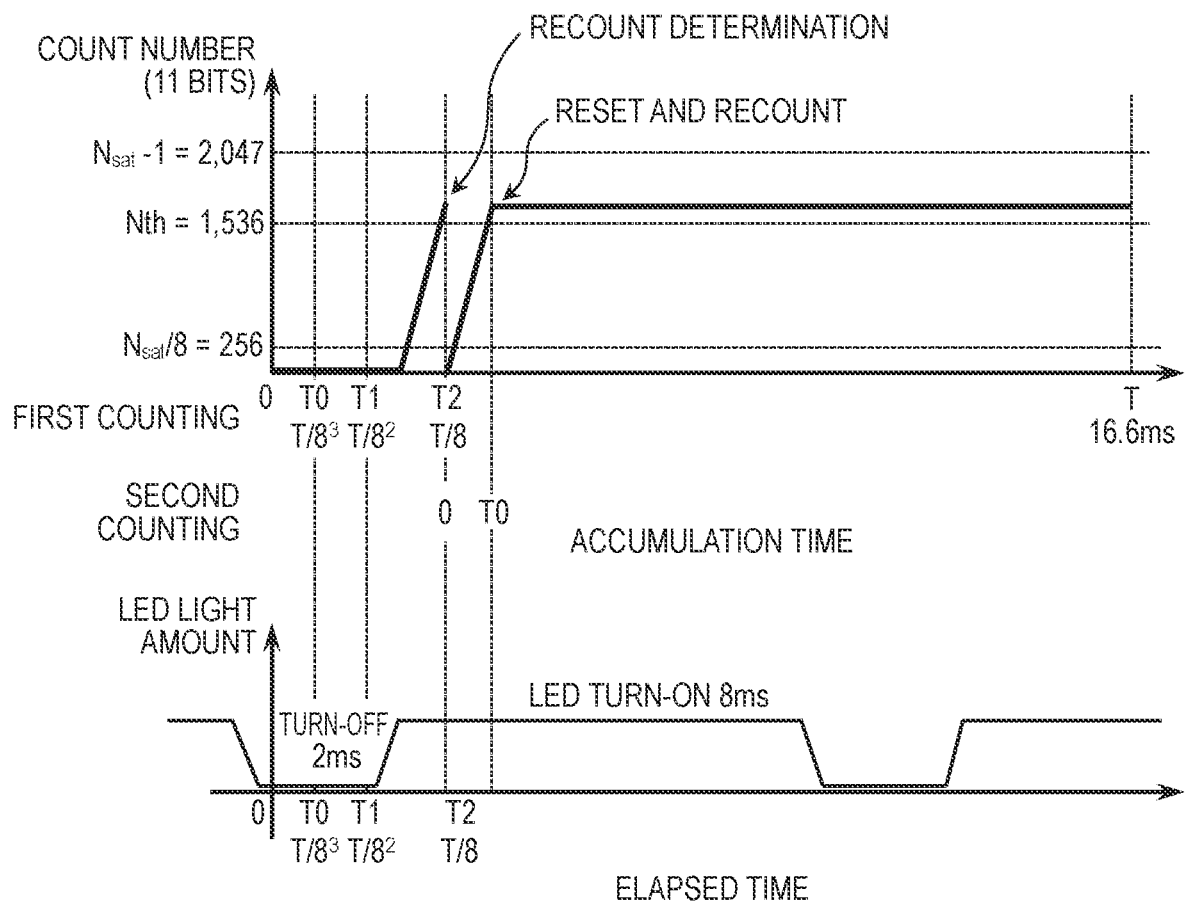
FIG. 11 is a timing chart illustrating an effect of flicker suppression in the photoelectric conversion device according to the first embodiment of the present invention.

FIG. 1 is a block diagram illustrating a schematic configuration of a photoelectric conversion system according to the present embodiment. FIG. 2 is a block diagram illustrating a schematic configuration of a photoelectric conversion device in the photoelectric conversion system according to the present embodiment. FIG. 3 is a block diagram illustrating a configuration example of a pixel in the photoelectric conversion device according to the present embodiment. FIG. 4 is a block diagram illustrating a configuration example of a counting control unit in the photoelectric conversion device according to the present embodiment. FIG. 5 is a block diagram illustrating a configuration example of a comparison unit in the photoelectric conversion device according to the present embodiment. FIG. 6 is a timing chart illustrating an operation of the photoelectric conversion unit and the counting unit in the photoelectric conversion device according to the present embodiment. FIG. 7 is a graph illustrating a relationship between a count value and an accumulation time. FIG. 8A and FIG. 8B are diagrams illustrating criteria for determining whether or not recounting is necessary in the photoelectric conversion device according to the present embodiment. FIG. 9 is a timing chart illustrating a recount operation in the photoelectric conversion device according to the present embodiment. FIG. 10 is a timing chart illustrating an operation of the photoelectric conversion device using the PWEC method. FIG. 11 is a timing chart illustrating an effect of the flicker suppression in the photoelectric conversion device according to the present embodiment.

First, the general configuration of the photoelectric conversion system according to the present embodiment will be described with reference to FIG. 1. As illustrated in FIG. 1, the photoelectric conversion system 100 according to the present embodiment includes an optical lens 110, a photoelectric conversion device 120, a development processing unit 130, an external interface (I/F) unit 140, a storage unit 150, and an imaging control unit 160. The optical lens 110 is disposed so that the incident light may be focused on the photoelectric conversion device 120. The photoelectric conversion device 120 is connected to the development processing unit 130 and the imaging control unit 160. The development processing unit is connected to the external I/F unit 140, the storage unit 150, and the imaging control unit 160. The external I/F unit 140 is connected to the imaging control unit 160. The storage unit 150 is connected to the imaging control unit 160.

The optical lens 110 condenses the incident light on the imaging surface of the photoelectric conversion device 120. The photoelectric conversion device 120 converts the incident light into an electric signal and outputs the electric signal to the development processing unit 130 in accordance with the operation setting from the imaging control unit 160. The development processing unit 130 performs demosaic processing on the electric signal received from the photoelectric conversion device 120, and performs protocol conversion of the signal after the demosaic processing into a format capable of being received by the external I/F unit 140. The storage unit 150 is a frame memory for temporarily storing output data of the development processing unit 130 in order to perform frame rate conversion or the like. The imaging control unit 160 has a role of controlling the operation of the photoelectric conversion device 120, the development processing unit 130, the external I/F unit 140, and the storage unit 150 by setting operational parameters of respective parts.

Next, the photoelectric conversion device 120 will be described in detail with reference to FIG. 2. As illustrated in FIG. 2, the photoelectric conversion device 120 includes a pixel region 10, a register block 20, a vertical scanning circuit 40, a horizontal scanning circuit 50, a signal processing circuit 60, an output circuit 70, a control circuit 80, and a driving control circuit 90.

The pixel region 10 is provided with a plurality of pixels 12 arranged in an array so as to form a plurality of rows and a plurality of columns. The number of pixels 12 constituting the pixel region 10 is not particularly limited. For example, the pixel region 10 may be constituted by a plurality of pixels 12 arranged in an array of several thousands of rows and several thousands of columns as in a general digital camera. Alternatively, the pixel region 10 may be configured by a plurality of pixels 12 arranged in one row or one column. Alternatively, one pixel 12 may configure the pixel region 10.

In each row of the pixel array of the pixel region 10, a control line 14 is arranged extending in a first direction (lateral direction in FIG. 1). Each of the control lines 14 is connected to the pixels 12 arranged in the first direction on the corresponding row, and serves as a signal line common to these pixels 12. The first direction in which the control lines 14 extend may be denoted as a row direction or a horizontal direction. Each of the control lines 14 may include a plurality of signal lines for supplying a plurality of types of control signals to the pixels 12. The control line 14 of each row is connected to the vertical scanning circuit 40.

In each column of the pixel array of the pixel region 10, a control line 16 is arranged extending in a second direction (vertical direction in FIG. 1) intersecting with the first direction. Each of the control lines 16 is connected to the pixels 12 arranged in the second direction on the corresponding column, and serve as a signal line common to these pixels 12. The second direction in which the control lines 16 extend may be denoted as a column direction or a vertical direction. Each of the control lines 16 may include a plurality of signal lines for supplying a plurality of types of control signals to the pixels 12. The control line 16 of each column is connected to the horizontal scanning circuit 50.

A periodic signal line 18, a setting signal line 22, and a pixel signal output line 24 are connected to each of the plurality of pixels 12 arranged in the pixel region 10. The periodic signal line 18 is connected to the driving control circuit 90. The setting signal line 22 is connected to the register block 20.

The setting signal line 22 may include a plurality of signal lines for supplying a plurality of kinds of signals to the pixels 12. The pixel signal output line 24 may include a plurality of signal lines for transferring a digital signal of a plurality of bits output from the pixel 12 bit by bit. The pixel signal output line 24 may be configured by a plurality of signal lines arranged in each column of the pixel array of the pixel region 10, or may be configured by a plurality of signal lines arranged in each row of the pixel array of the pixel region 10. The pixel signal output line 24 is connected to the signal processing circuit 60 and the control circuit 80.

The vertical scanning circuit 40 is a control circuit having a function of receiving a control signal output from the driving control circuit 90, generating a row control signal for driving the pixels 12, and supplying the row control signal to the pixels 12 via the control lines 14. A logic circuit such as a shift register, or an address decoder may be used for the vertical scanning circuit 40. The vertical scanning circuit 40 drives the plurality of pixels 12 in the pixel region 10 in units of rows by supplying the row control signal via the control line 14. The vertical scanning circuit 40 mainly has a role of sequentially supplying the row control signals to the control lines 14 of the respective rows of the pixel region 10 and sequentially selecting the rows outputting the pixel signals. The vertical scanning circuit 40 also has a role of supplying a signal for internal driving of the pixel 12 to the pixel 12.

The horizontal scanning circuit 50 is a control circuit having a function of receiving a control signal output from the driving control circuit 90, generating a column control signal for driving the pixels 12, and supplying the column control signal to the pixels 12 via the control lines 16. A logic circuit such as a shift register, or an address decoder may be used for the horizontal scanning circuit 50. The horizontal scanning circuit 50 drives the plurality of pixels 12 in the pixel region 10 in units of columns by supplying the column control signal via the control line 16. The horizontal scanning circuit 50 mainly has a role of sequentially supplying the column control signals to the control lines 16 of respective columns of the pixel region 10 and sequentially selecting the columns outputting pixel signals.

The register block 20 receives data from a system disposed at a subsequent stage such as ISP (Image Signal Processor), ASIC (Application Specific Integrated Circuit), FPGA (Field Programmable Gate Array) from the imaging control unit 160. The register block 20 has a role of holding the received data as setting values of various sensor operations of the photoelectric conversion device 120. The data communication means between the subsequent stage system and the register block 20 is not particularly limited, and for example, serial communication means such as I2C (Inter-Integrated Circuit) or SPI (Serial Peripheral Interface) may be applied.

The register block 20 stores various settings such as timing setting of the operation of the photoelectric conversion device 120, pixel driving conditions and setting of drive capability in the analog driving portion, and distributes them to each circuit via the setting signal line 22. In FIG. 2, for simplicity, only the setting signal line 22 connecting the register block 20 and the pixel 12 is illustrated.

The pixel signal output line 24 is connected to each pixel 12, and the output signal of the pixel 12 selected by the row control signal from the vertical scanning circuit 40 and the column control signal from the horizontal scanning circuit 50 is output to the signal processing circuit 60 and the control circuit 80 via the pixel signal output line 24.

The signal processing circuit 60 is a processing circuit that performs predetermined digital arithmetic processing, for example, offset processing or digital gain processing, on the pixel signal inputted via the pixel signal output line 24, in accordance with the driving signal from the imaging control unit 160. The digital arithmetic processing performed by the signal processing circuit 60 is not particularly limited, and various other digital arithmetic processing may be applied.

The output circuit 70 includes a serializer that converts parallel data into serial data and an external interface circuit, and transmits the pixel signal after digital arithmetic processing in the signal processing circuit 60 to the subsequent-stage system such as the ISP, the ASIC, or the FPGA. As the external interface circuit, for example, a SerDes (SERializer/DESerializer) transmission circuit such as an LVDS (Low Voltage Differential Signaling) circuit or an SLVS (Scalable Low Voltage Signaling) circuit may be applied. Note that the configuration of the output circuit 70 is not limited thereto, and may be another configuration such as a parallel output.

The control circuit 80 is connected to the register block 20, the signal processing circuit 60, and the output circuit 70. The control circuit 80 performs processing based on the pixel signal input from the pixel signal output line 24, and outputs a signal for limiting functions to the signal processing circuit 60 and the output circuit 70 to reduce power consumption as necessary. The control circuit 80 further has a function of generating data for setting the operation mode of the pixel 12 based on the pixel signal input from the pixel signal output line 24 and supplying the generated data to the register block 20.

The driving control circuit 90 is a control circuit for generating control signals for controlling the operations and timings of the vertical scanning circuit 40, the horizontal scanning circuit 50, and the like, and supplying the control signals to each circuit block. Although not illustrated in FIG. 1 for simplicity, control signals for controlling other circuit blocks other than the vertical scanning circuit 40 and the horizontal scanning circuit 50 may be also supplied at the same time to control the general operation of the photoelectric conversion device 120. The driving control circuit 90 supplies a periodic signal (clock signal CLK) to each of the plurality of pixels 12 via the periodic signal line 18. The driving control circuit 90 may be driven by a clock signal input from the outside, or may be driven by a clock signal from a PLL circuit or the like provided inside the photoelectric conversion device 120. The driving control circuit 90 may be driven by a driving signal supplied from the imaging control unit 160.

As illustrated in FIG. 3, each pixel 12 includes a photoelectric conversion unit 30, a counting unit 32, a counting control unit 34, a pixel data storage unit 36, and a pixel readout unit 38. The photoelectric conversion unit 30 includes a photoelectric conversion element PD, a clock gate unit LG1, a waveform shaping unit LG2, and a switch unit MP.

The photoelectric conversion element PD may be formed of an avalanche photodiode (hereinafter referred to as "APD"). The switch unit MP may be formed of a p-channel MOS transistor. An anode of the APD constituting the photoelectric conversion element PD is connected to a node to which a voltage VL is supplied. A cathode of the APD constituting the photoelectric conversion element PD is connected to a drain of the p-channel MOS transistor constituting the switch unit MP. A source of the p-channel MOS transistor constituting the switch unit MP is connected to a node to which a voltage VH is supplied.

The clock gate unit LG1 may be configured by, for example, a two-input OR circuit. The waveform shaping unit LG2 may be configured by, for example, a two-input AND circuit. A signal (clock signal) CLK including periodical pulses of a predetermined period is input to one input node of the OR circuit constituting the clock gate unit LG1, and a signal (stop signal to be described later) supplied from the counting control unit 34 is input to the other input node of the OR circuit constituting the clock gate unit LG1. The output node of the OR circuit constituting the clock gate unit LG1 is connected to a gate of the p-channel MOS transistor constituting the switch unit MP. The periodic signal (clock signal CLK) is input to one input node of the AND circuit constituting the waveform shaping unit LG2, and an inverting signal at a node-A which is a connection portion between the photoelectric conversion element PD and the switch unit MP is input to the other input node of the AND circuit constituting the waveform shaping unit LG2. A node-B, which is an output node of the AND circuit constituting the waveform shaping unit LG2, is connected to the counting unit 32.

The counting unit 32 is connected to the counting control unit 34 and the pixel data storage unit 36. The counting control unit 34 is connected to the pixel data storage unit 36. The pixel data storage unit 36 is connected to the pixel readout unit 38. The pixel readout unit 38 is connected to the pixel signal output line 24. An enable signal EN is input to the counting unit 32, and a reset signal RESET and a predetermined timing signal TIMING are input to the counting control unit 34. A control signal WRITE is input to the pixel data storage unit, and a control signal READ is input to the pixel readout unit 38.

The photoelectric conversion element PD may be formed of APD as described above. The voltage VL and the voltage VH are set such that a reverse bias voltage sufficient for the APD to perform the avalanche multiplication operation is applied. In one example, a negative high voltage is applied as the voltage VL, and a positive voltage about a power supply voltage is applied as the voltage VH. For example, the voltage VL is about −30 V, and the voltage VH is about 1 V. By supplying a reverse bias voltage sufficient to perform the avalanche multiplication operation to the APD, charge generated by light incidence to the APD causes avalanche multiplication, and an avalanche current is generated. The operation modes in the state where the reverse bias voltage is supplied to the APD include a Geiger mode and a linear mode. The Geiger mode is an operation mode in which a voltage applied between the anode and the cathode is set to a reverse bias voltage larger than a breakdown voltage of the APD. The linear mode is an operation mode in which a voltage applied between the anode and the cathode is set to a reverse bias voltage close to or lower than the breakdown voltage of the APD. The APD operating in the Geiger mode is called SPAD. The APD constituting the photoelectric conversion element PD may operate in the linear mode or the Geiger mode.

The switch unit MP has a role of switching between a period (photon detection period) during which photons incident on the photoelectric conversion element PD are detected and a period (charging period) during which the photoelectric conversion element PD is charged. That is, when the switch unit MP is turned on by receiving a low-level signal from the clock gate unit LG1, the voltage VH is supplied to the node-A, and the photoelectric conversion element PD is charged. Further, by receiving a high-level signal from the clock gate unit LG1 and turning off the switch unit MP, the node-A is disconnected from the voltage VH, and the potential of the node-A is changed in accordance with the incidence of photons. The output signal of the clock gate unit LG1 becomes low-level when both the clock signal CLK and the signal (stop signal) from the counting control unit 34 are at low-level, and becomes high-level otherwise.

The clock gate unit LG1 has a role as a control circuit that periodically controls the APD in accordance with the clock signal CLK between a standby state in which avalanche multiplication is possible and a recharge state that returns the APD to a state in which avalanche multiplication is possible again after avalanche multiplication occurs.

The waveform shaping unit LG2 has a role of outputting a photon detection signal indicating that a photon is incident on the photoelectric conversion element PD during the photon detection period. That is, the waveform shaping unit LG2 outputs a high-level signal (photon detection signal) when the potential of the node-A becomes lower than a predetermined determination threshold value in response to the incidence of a photon on the photoelectric conversion element PD during a period in which the clock signal CLK is at high-level (photon detection period). The signal level of the output node (node-B) of the waveform shaping unit LG2 becomes low-level at a timing at which the photon detection period ends, that is, at a falling edge at which the clock signal CLK next transits from high-level to low-level.

The counting unit 32 includes a counter that counts up each time a rising edge of the photon detection signal output from the waveform shaping unit LG2 is detected, and outputs a count value, which is a count result of the counter, to the counting control unit 34 and the pixel data storage unit 36. The counting operation in the counting unit 32 is performed during a period (accumulation period) in which the enable signal EN is at high-level. The counting unit 32 resets the count value in response to a reset instruction from the counting control unit 34.

The pixel data storage unit 36 stores a pixel signal based on the count value of the counting unit 32 and the output signal of the counting control unit 34 in accordance with a write instruction (control signal WRITE) supplied from the control circuit 80 via the setting signal line 22.

The pixel readout unit 38 outputs the pixel signal stored in the pixel data storage unit 36 to the pixel signal output line 24 in response to a readout instruction (control signal READ) supplied from the control circuit 80 via the setting signal line 22.

The counting control unit 34 controls the counting operation in the counting unit 32 in accordance with the count value in the counting unit 32, the predetermined timing signal TIMING, and the reset signal RESET. The control of the count operation includes determination of continuation, stop, and restart of the count operation and execution thereof.

Next, a specific configuration example of the counting control unit 34 will be described with reference to FIG. 4. As illustrated in, e.g., FIG. 4, the counting control unit 34 may be configured by comparison units 341 and 342, storage units 343 and 344, a recount determination unit 345, a stop signal generation unit 346, and a reset signal generation unit

347. The comparison unit 341 includes latch circuits LC1 and LC2. The comparison unit 342 includes a latch circuit LC3. The storage unit 343 includes memories MEM0, MEM1, and MEM2. The storage unit 344 includes memories MEM3 and MEM4. The recount determination unit 345 includes two-input XOR circuits LG3 and LG4. The stop signal generation unit 346 includes a four-input OR circuit LG5. The reset signal generation unit 347 includes two-input AND circuits LG6 and LG7 and three-input OR circuits LG8.

The count value of the counting unit 32 is input to the comparison units 341 and 342. The latch circuits LC1 and LC2 hold a signal corresponding to the result of comparison by the comparison unit 341. The latch circuit LC3 holds a signal corresponding to the result of comparison by the comparison unit 342. An output node of the latch circuit LC1 is connected to input nodes of the memories MEM0, MEM1, and MEM2. An output node of the latch circuit LC2 is connected to an input node of the OR circuit LG5.

An output node of the latch circuit LC3 is connected to input nodes of the memories MEM3 and MEM4 and input nodes of the AND circuits LG6 and LG7. An output node of the memory MEM0 is connected to the pixel data storage unit 36 and an input node of the OR circuit LG5. An output node of the memory MEM1 is connected to an input node of the XOR circuit LG3. An output node of the memory MEM2 is connected to an input node of the XOR circuit LG4. An output node of the memory MEM3 is connected to an input node of the XOR circuit LG3 and an input node of the AND circuit LG6. An output node of the memory MEM4 is connected to an input node of the XOR circuit LG4 and an input node of the AND circuit LG7.

An output node of the XOR circuit LG3 is connected to the pixel data storage unit 36 and an input node of the OR circuit LG5. An output node of the XOR circuit LG4 is connected to the pixel data storage unit 36 and an input node of the OR circuit LG5. An output node of the OR circuit LG5 is connected to the input node of the clock gate unit LG1 and the counting unit 32. An output node of the AND circuit LG6 and an output node of the AND circuit LG7 are connected to input nodes of the OR circuit LG8. A reset signal RESET is supplied to the other input node of the OR circuit LG8. An output node of the OR circuit LG8 is connected to the counting unit 32 and comparison units 341 and 342.

The comparison unit 341 compares the count value acquired from the counting unit 32 with a first threshold value, and causes the latch circuit LC1 to hold a high-level signal when the acquired count value is equal to or greater than the first threshold value.

Here, the first threshold is a threshold value for determining pixel saturation. For example, when the counter of the counting unit 32 is a 11-bit counter and the count saturation value (Nsat) is 2048 LSB, the first threshold value may be set to 256 LSB (=Nsat/8). In this case, the latch circuit LC1 may be configured by a D-latch which receives the 8th bit of the count value supplied from the counting unit 32 as an input. The first threshold is preferably set to $2N$ ($N=0, 1, 2, \ldots$). By setting the first threshold value to $2N$, the function may be realized by a small circuit that only outputs the N-th bit of the count value to the latch circuit LC3.

The comparison unit 341 compares the count value acquired from the counting unit 32 with the count upper limit value of the counting unit 32, and causes the latch circuit LC2 to hold a high-level signal when the acquired count value is equal to the count upper limit value of the counting unit 32. For example, when the counter of the counting unit 32 is a 11-bit counter, the count upper limit value is 2047 LSB (=Nsat−1). In this case, the latch circuit LC2 may be configured by a D-latch which receives the 11th bit of the count value supplied from the counting unit 32 as an input.

The comparison unit 342 compares the count value acquired from the counting unit 32 with a second threshold value, and causes the latch circuit LC3 to hold a high-level signal when the acquired count value is equal to or greater than the second threshold value.

Here, the second threshold value is a threshold value used for determining whether or not recounting is necessary, and is set to a value larger than the first threshold value. For example, when the counter of the counting unit 32 is a 11-bit counter and the first threshold is 256 LSB, the second threshold value (Nth) may be set to 1536 LSB. In this case, for example, as illustrated in FIG. 5, the comparison unit 342 may include a D-latch D1, a D-latch D2, and a two-input AND circuit LG9. The D-latch D1 receives the 10th bit (Count [9]) of the count value at the D-terminal and the enable signal Enable at the E-terminal as inputs. The D-latch D2 receives the 9th bit (Count [8]) of the count value at the D-terminal and the enable signal Enable at the E-terminal as inputs. The AND circuit LG9 receives the output of the D-latch D1 and the output of the D-latch D2 as inputs, and outputs a logical product of them. The output of the AND circuit LG9 becomes the output of the latch circuit LC3. The second threshold value may be dynamically changed. As the enable signal Enable, a periodic signal (clock signal CLK) input to the photoelectric conversion unit 30 may be used, or the enable signal EN input to the counting unit 32 may be used.

The memories MEM0, MEM1, and MEM2 of the storage unit 343 are configured to hold the output of the latch circuit LC1 in synchronization with the timing signal TIMING. Specifically, the memory MEM0 holds the output of the latch circuit LC1 at time T0, the memory MEM1 holds the output of the latch circuit LC1 at time T1, and the memory MEM2 holds the output of the latch circuit LC1 at time T2. Here, the times T0, T1, and T2 are times arriving in this order during one accumulation time. The timing signal TIMING is a signal whose level changes at the times T0, T1, and T2, and the memories MEM0, MEM1, and MEM2 hold the output of the latch circuit LC1 in synchronization with the edge of the timing signal TIMING.

The memories MEM3 and MEM4 of the storage unit 344 are configured to hold the output of the latch circuit LC3 in synchronization with the timing signal TIMING. Specifically, the memory MEM3 holds the output of the latch circuit LC3 at the time T1, and the memory MEM4 holds the output of the latch circuit LC3 at the time T2. Similar to the memories MEM0, MEM1, and MEM2, the memories MEM3 and MEM4 hold the output of the latch circuit LC3 in synchronization with the edge of the timing signal TIMING.

The XOR circuit LG3 of the recount determination unit 345 is used to generate a control signal based on the result of the recount necessity determination at the time T1. The XOR circuit LG3 receives the output of the memory MEM1 and the output of the memory MEM3 as inputs, and outputs an exclusive OR of them. The output signal of the XOR circuit LG3 is input to the pixel data storage unit 36 and the stop signal generation unit 346. The XOR circuit LG4 of the recount determination unit 345 is used to generate a control signal based on the result of the recount necessity determination at the time T2. The XOR circuit LG4 receives the output of the memory MEM2 and the output of the memory MEM4 as inputs, and outputs an exclusive OR of them. The output signal of the XOR circuit LG4 is input to the pixel data storage unit 36 and the stop signal generation unit 346.

The output signal of the latch circuit LC2, the output signal of the memory MEM0, the output signal of the XOR circuit LG3, and the output signal of the XOR circuit LG4 are input to the input nodes of the OR circuit LG5 of the stop signal generation unit 346. The output signal of the OR circuit LG5 is input to the counting unit 32 and the clock gate unit LG1.

The output signal of the latch circuit LC3 and the output signal of the memory MEM3 are input to the input nodes of the AND circuit LG6 of the reset signal generation unit 347. The output signal of the AND circuit LG6 is input to the OR circuit LG8. The output signal of the latch circuit LC3 and the output signal of the memory MEM4 are input to the input nodes of the AND circuit LG7. The output signal of the AND circuit LG7 is input to the OR circuit LG8. The output signal of the OR circuit LG8 is input to the counting unit 32 and comparison units 341 and 342.

Next, an operation example of the photoelectric conversion device according to the present embodiment will be described with reference to FIG. 6 to FIG. 9. In the present embodiment, a method of driving the photoelectric conversion device in which a clocked recharging method and a PWEC (Pixel-Wise Exposure Control) method are combined will be described. Here, the clocked recharging method is a method of periodically recharging the photoelectric conversion element PD. The PWEC method is a method in which, for each pixel 12, a count operation is performed in a normal accumulation time when the brightness is normal, and a count operation is performed in a short accumulation time when the brightness is extremely bright.

First, basic operations of the photoelectric conversion unit 30 and the counting unit 32 will be described with reference to a timing chart of FIG. 6. FIG. 6 illustrates the signal level of the clock signal CLK, the voltage of the node-A, the signal level of the node-B, and the count value of the counter of the counting unit 32. Further, in FIG. 6, the timings at which photons enter the photoelectric conversion element PD are indicated by arrows in the upper part of the signal waveform.

It is assumed that, just before time t1, the clock signal CLK is at high-level, the voltage of the node-A is at VH, and the signal level of the node-B is at high-level. It is also assumed that the count value of the counter of the counting unit 32 is N.

At the time t1, it is assumed that the clock signal CLK transitions from high-level to low-level. As a result, the switch unit MP is turned on, and the charging operation of the photoelectric conversion element PD is started. After that, although the clock signal CLK transits from low-level to high-level, the node-A remains at the voltage VH, and the signal level of the node-B remains at low-level.

It is assumed that a photon is incident on the photoelectric conversion element PD at time t2 after the clock signal CLK becomes low-level to shift to the photon detection period. As a result, avalanche multiplication occurs in the photoelectric conversion element PD, and the voltage of the node-A decreases from the voltage VH to a predetermined voltage corresponding to the on-resistance of the p-channel transistor. When the voltage of the node-A is lower than the predetermined determination threshold value, the signal level of the node-B, which is the output node of the waveform shaping unit LG2, transitions from low-level to high-level. As a result, the count value of the counter of the counting unit 32 increases by 1 LSB from N, and becomes N+1.

It is assumed that, after the time t2, photons enter the photoelectric conversion element PD at time t3 and time t4 before the time t5 at which the clock signal CLK next transits from high-level to low-level. At the time t3 and the time t4, avalanche multiplication has already occurred in the photoelectric conversion element PD, and the photoelectric conversion element PD is in a state before recharging. Therefore, the signal level of each node does not transit by the photons incident at the time t3 and the time t4, and the photons incident at the time t3 and the time t4 are not counted by the counting unit 32. The photons that are not counted in this way are indicated by broken arrows at the top of the waveform of the voltage at node-A.

At the time t5, it is assumed that the clock signal CLK transits from high-level to low-level. As a result, the switch unit MP is turned on, the charging operation of the photoelectric conversion element PD is started, and the voltage of the node-A returns to the voltage VH. In response to the voltage change of the node-A, the signal level of the node-B transitions from high-level to low-level.

It is assumed that the clock signal CLK transits from high-level to low-level at the subsequent time t6. Assuming that no photons enter the photoelectric conversion element PD during the period from the time t5 to the time t6, the voltage of the node-A and the signal level of the node-B do not change during this period.

Similarly, after time t7, when a photon is incident during a period from the transition of the clock signal CLK from low-level to high-level to the next transition of the clock signal CLK from high-level to low-level, a photon detection signal is output from the waveform shaping unit LG2. For example, during a period from the time t6 to time t8, the count value of the counting unit 32 increases by 1 LSB from N+1 to N+2 in accordance with the incidence of a photon at the time t7. In the period from the time t8 to time t10, the count value of the counting unit 32 increases by 1 LSB from N+2 to N+3 in accordance with the incidence of a photon at time t9. On the other hand, when no photon is incident during a period from the transition of the clock signal CLK from low-level to high-level to the next transition of the clock signal CLK from high-level to low-level, the voltage of the node-A and the signal level of the node-B do not change. That is, the photons are not counted.

That is, the counting unit 32 operates so as to count the number of periods during which at least one avalanche multiplication occurs in the photoelectric conversion element PD among the periods defined by the intervals of the pulses superimposed on the clock signal CLK.

Next, an operation example of the counting control unit 34 will be described with reference to FIG. 7 to FIG. 9. Here, the following conditions are assumed for the specific description of the driving by the PWEC method. That is, the counting unit 32 is configured by a counter of 11 bits, and the count saturation value (Nsat) is 2048. The driving speed of the pixel 12 is 60 frames per second (=16.6 ms/frame), and the accumulation time is four kinds including 16.6 ms (T), 2.07 ms (T2=T/8), 259 μs (T1=T/8$^2$), and 32.4 μs (T0=T/8$^3$). The first threshold value is set as a threshold value for determining pixel saturation, and the value is set as 256 (Nsat/8) LSB. The pixel saturation determination is performed at each of the timings T0, T1, and T2 after the start of the accumulation period. Further, the second threshold value is set as a threshold value for determining whether or not recounting is necessary, and the value is set to 1536 LSB. It is assumed that the determination of the recount is performed at each of the timings T1 and T2 after the start of the accumulation period. However, since these conditions vary depending on the basic configuration of the system and the measurement environment, such as the number of bits of the counter constituting the counting unit 32, the blinking period and the brightness of the light source, the configuration of each unit of the pixel 12 may be appropriately changed according to these conditions.

The counting control unit 34 acquires the count value held by the counting unit 32. The comparison units 341 and 342 compare the count value acquired from the counting unit 32 with a predetermined determination value, and hold the determination value according to the comparison result in the latch circuits LC1, LC2, and LC3. That is, the comparison unit 341 compares the acquired count value with the first threshold value serving as a reference for the saturation determination, and causes the latch circuit LC1 to hold a high-level determination signal when the count value is equal to or greater than the first threshold value. Further, the comparison unit 341 compares the acquired count value with the count upper limit value of the counting unit 32, and causes the latch circuit LC2 to hold a high-level determination signal when the count value is the count upper limit value of the counting unit 32. The comparison unit 342 compares the acquired count value with the second threshold value serving as a reference for determination of recounting, and causes the latch circuit LC3 to hold a high-level determination signal when the count value is equal to or greater than the second threshold value.

FIG. 7 is a graph illustrating the relationship between the count value of the counting unit 32 and the accumulation time in four pixels 12A, 12B, 12C and 12D having different incident light amounts. In FIG. 7, it is assumed that the pixel 12A has a count value of 2000 LSB at time T0 (accumulation time 32.4 µs (=T/$8^3$)). It is assumed that the pixel 12B has a count value of 500 LSB at time T1 (accumulation time 259 µs (=T/$8^2$)). It is assumed that the count value of the pixel 12C at time T2 (the accumulation time of 2.07 ms (=T/8)) is 350 LSB. It is assumed that the pixel 12D has a count value of 400 LSB at time T (accumulation time 16.6 ms (=T)).

The determination of the pixel saturation using the first threshold value is performed at each timing of times T0, T1, and T2. For example, when the first threshold value is 256 LSB (=Nsat/8), the pixel 12A is determined as pixel saturation at time T0, the pixel 12B is determined as pixel saturation at time T1, and the pixel 12C is determined at time T2. The pixel 12D is not determined to be saturated at any of the times T0, T1, and T2. The result of the saturation determination at times T0, T1, and T2 using the first threshold is held in the memories MEM0, MEM1, and MEM2 of the storage unit 343, respectively. That is, a high-level signal is held in the corresponding memory when it is determined that pixel saturation is present, and a low-level signal is held in the corresponding memory when it is determined that pixel saturation is absent.

The determination of the necessity of recounting using the second threshold value is performed at each timing of the times T1 and T2. The method of determining the necessity of recounting is the same as the method of saturation determination except that the determination threshold is different. The result of the determination of the necessity of recounting at the times T1 and T2 using the second threshold is held in the memories MEM3 and MEM4 of the storage unit 344. That is, when it is determined that the need for recounting is high, a high-level signal is held in the corresponding memory, and when it is determined that the need for recounting is low, a low-level signal is held in the corresponding memory.

The final count value in the PWEC method is calculated by multiplying each count value by a coefficient corresponding to the length of the accumulation time. For example, the final count value of the pixel 12A is 1024000 LSB obtained by multiplying 2000 LSB by the coefficient $8^3$. The final count value of the pixel 12B is 32000 LSB obtained by multiplying 500 LSB by a coefficient $8^2$. The final count value of the pixel 12C becomes 2800 LSB obtained by multiplying 350 LSB by a coefficient 8. The final count value of the pixel 12D is 400 LSB obtained by multiplying 400 LSB by a coefficient 1.

When the count value acquired from the counting unit 32 is the count upper limit value of the counting unit 32, the output of the latch circuit LC2 becomes high-level, and the output of the OR circuit LG5 constituting the stop signal generation unit 346 becomes high-level. As a result, the output of the OR circuit constituting the clock gate unit LG1 becomes high-level, and the recharging of the photoelectric conversion element PD and the counting operation in the counting unit 32 are stopped.

When it is determined that pixel saturation occurs as a result of the saturation determination at the time T0, the output of the memory MEM0 becomes high-level, and the output of the OR circuit LG5 constituting the stop signal generation unit 346 becomes high-level. As a result, the output of the OR circuit constituting the clock gate unit LG1 becomes high-level, and the recharging of the photoelectric conversion element PD and the counting operation in the counting unit 32 are stopped. When it is determined that pixel saturation has not occurred as a result of the saturation determination at the time T0, it is determined that saturation determination and recounting determination at the times T1 and T2 are necessary.

The recount determination unit 345 determines the necessity of recounting based on the result of the determination of saturation and the necessity of recounting at times T1 and T2, that is, the information held in the memories MEM1, MEM2, MEM3, and MEM4. FIG. 8A and FIG. 8B summarize criteria for determining whether recounting is necessary in the recount determination unit 345. FIG. 8A illustrates a criterion at time T1, and FIG. 8B illustrates a criterion at time T2.

In the determination at the time T1, when both the output of the memory MEM1 and the output of the memory MEM3 are at low-level, the recounting is not performed, and the counting operation in the counting unit 32 is continued. When the output of the memory MEM1 is at high-level and the output of the memory MEM3 is at low-level, since pixel saturation occurs, the counting operation is stopped (not recounted) as in the case of the saturation determination at the time T0. When both the output of the memory MEM1 and the output of the memory MEM3 are at high-level, recounting is executed. The condition that the output of the memory MEM1 is at low-level and the output of the memory MEM3 is at high-level cannot occur.

Similarly, in the determination at the time T2, when both the output of the memory MEM2 and the output of the memory MEM4 are at low-level, the recounting is not performed, and the counting operation in the counting unit 32 is continued. When the output of the memory MEM2 is at high-level and the output of the memory MEM4 is at low-level, since pixel saturation occurs, the counting operation is stopped (not recounted) as in the case of the saturation determination at the time T0. When both the output of the memory MEM2 and the output of the memory MEM4 are at high-level, recounting is executed. The condition that the output of the memory MEM2 is at low-level and the output of the memory MEM4 is at high-level cannot occur.

The determination of the recounting is made for the pixel 12 which is not saturated (less than the first threshold value) in the saturation determination at the time T0, but is operated to rapidly increase the count value at the time T1 or T2. Such a pixel 12 is highly likely to be started to accumulate at a timing of turning off in a flashing light source, for example, an LED traffic signal, and may cause flicker when an image is displayed, so that recounting is performed. The influence of image defects and increase in power consumption due to recounting is minor.

When the saturation determination and the recount determination are made at the time T1, the output of the latch circuit LC3 and the output of the memory MEM2 become high-level, and the output of the AND circuit LG6 of the reset signal generation unit 347 becomes high-level. As a result, the output of the OR circuit LG8 becomes high-level, and the count value of the counting unit 32 and the values of the latch circuits LC1, LC2, and LC3 are reset regardless of the signal level of the reset signal RESET from the control circuit 80, and recounting in the counting unit 32 is started. Similarly, when the saturation determination and the recount determination are made at the time T2, the output of the latch circuit LC3 and the output of the memory MEM4 become high-level, and the output of the AND circuit LG7 of the reset signal generation unit 347 becomes high-level. Thereby, the output of the OR circuit LG8 becomes high-level, and the count value of the counting unit 32 and the values of the latch circuits LC1, LC2, and LC3 are reset regardless of the reset signal RESET from the control circuit 80, and recounting in the counting unit 32 is started.

In the present embodiment, the XOR circuits LG3 and LG4 are inserted between the memories MEM1, MEM2, MEM3, and MEM4 and the OR circuit LG5 so that the counting operation is not stopped when the saturation determination and the recount determination are performed at the same time. Thus, the counting operation may be stopped only when only the output of the memory MEM1 out of the memories MEM1 and MEM3 becomes high-level or only the output of the memory MEM2 out of the memories MEM2 and MEM4 becomes high-level.

FIG. 9 is a timing chart when it is determined that recounting is performed at time T1. FIG. 9 illustrates waveforms of the enable signal EN, the reset signal RESET, the output signal of the latch circuit LC3, the output signal of the memory MEM3, the output signal of the AND circuit LG6, and the output signal of the OR circuit LG8.

At time t20, the reset signal RESET becomes high-level, the count value of the counter of the counting unit 32 is reset to the initial value of 0, and the outputs of the latch circuits LC1, LC2, and LC3 are reset to low-level. When the enable signal EN becomes high-level at the subsequent time t21, the counting operation of the photon detection signal in the counting unit 32 is started. When the count value of the counter of the counting unit 32 reaches the second threshold value at time t22, the output of the latch circuit LC3 becomes high-level. Then, at the time T1, the output of the memory MEM3 becomes high-level, and the output of the AND circuit LG6 becomes high-level. Accordingly, the output of the OR circuit LG8 becomes high-level, the latch circuit LC3 is reset at time t23, the output of the AND circuit LG6 becomes low-level at time t24, and the output of the OR circuit LG8 becomes low-level at time t25. A period from the time T1 at which the output of the OR circuit LG8 becomes high-level to the time t25 is a reset period of the counting unit 32 for recounting. After the reset period has elapsed, recounting in the counting unit 32 is started.

The signals output from the memory MEM0 and the XOR circuits LG3 and LG4 to the pixel data storage unit 36 may be used as time information for calculating the final count value. That is, when the output signal of the memory MEM0 is at high-level, it indicates that the counting operation is stopped at time T0. When the output signal of the XOR circuit LG3 is at high-level, it indicates that the counting operation is stopped at time T1. When the output signal of the XOR circuit LG4 is at high-level, it indicates that the counting operation is stopped at time T2. Therefore, the final count value may be calculated by selecting the coefficient to be multiplied by the count value output from the counting unit 32 according to the signals output from the memory MEM0 and the XOR circuits LG3 and LG4.

Next, the effect of the flicker suppression in the photoelectric conversion device according to the present embodiment will be described with reference to FIG. 10 and FIG. 11. FIG. 10 is a timing chart illustrating the operation of a typical photoelectric conversion device using the PWEC method, and FIG. 11 is a timing chart illustrating the operation of the photoelectric conversion device according to the present embodiment. Here, an LED traffic signal is assumed as a flashing light source that causes flicker, and turn-off periods and turn-on periods of the light source are also illustrated in FIG. 10 and FIG. 11. Here, it is assumed that the blinking cycle of the LED traffic signal is 100 Hz and the duty ratio is 80% (repeating the turn-off 2 ms and the turn-on 8 ms).

First, the operation of a typical photoelectric conversion device using the PWEC method will be described. In FIG. 10, it is assumed that the accumulation period starts in a state where the LED traffic signal is turned off (solid line in FIG. 10). When the LED traffic signal is turned off, a relatively long accumulation time, for example, T/8 (=2.07 ms) is set, and the counting operation is performed. It is assumed that the count value is a low value while the LED traffic signal is turned off, but rapidly increases when the LED traffic signal is turned on, and reaches 2047 LSB at time T2 at the end time of the accumulation period. The substantial count value in this case is 16387 LSB obtained by multiplying 2047 LSB by 8.

On the other hand, when the accumulation period starts in a state in which the LED signal is turned on (a dotted line in FIG. 10), a relatively short accumulation time, for example, $T/8^3$ (=32.4 μs) is set, and the counting operation is performed. Assuming that the count value reaches 2000 LSB at time T0 at the end time of the accumulation period, the substantial count value is 1024000 LSB obtained by multiplying 2000 LSB by $8^3$. That is, at the start time of the accumulation period, the count value acquired depending on whether the LED signal is in the turn-off state or in the turn-on state, i.e., the brightness largely changes, and the image appears as a flicker.

Next, the operation of the photoelectric conversion device according to the present embodiment will be described. In FIG. 11, as in FIG. 10, it is assumed that the accumulation period starts in a state where the LED traffic signal is turned off.

When the LED traffic signal is turned off, a relatively long accumulation time, for example, T/8 (=2.07 ms) is set, and the counting operation is performed. The count value is a low value while the LED traffic signal is turned off, and is lower than the first threshold value (Nsat/8=256 LSB) at the times T0 and T1. When the count value exceeds the second threshold value (Nth=1536 LSB) at the time T2, the count value is determined to be recounted, the first count value is discarded, and the count operation is newly started from the time T2. This makes it possible to acquire an appropriate count value avoiding the influence of flicker.

Here, the case where the recount determination is made at the time T2 has been described, but the same applies to the case where the recount determination is made at the time T1. Also, when it is determined that recounting is performed again in the recounting operation, it is possible to deal with the recounting operation by repeating the same processing as that performed before the recounting operation.

As described above, according to the present embodiment, the occurrence of flicker may be effectively suppressed while the dynamic range is enlarged, and the power consumption is reduced.

Second Embodiment

Figure 12:
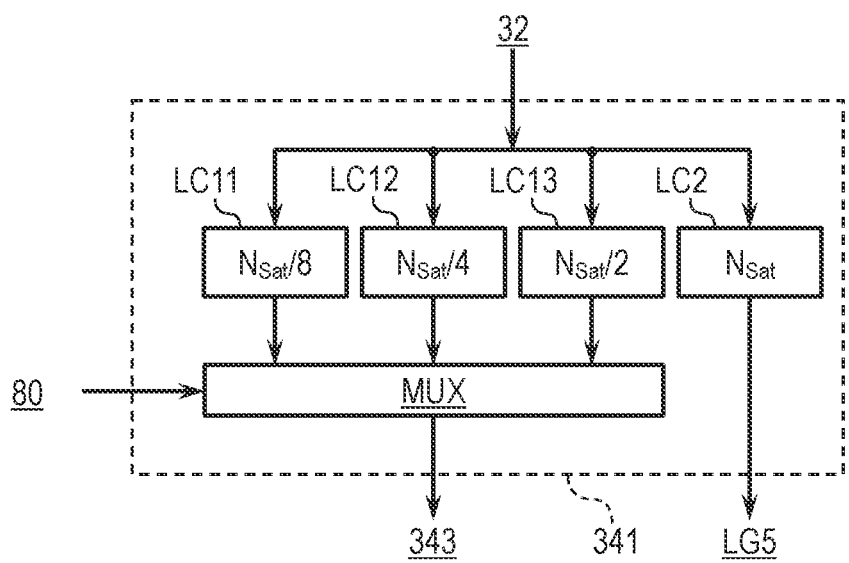
FIG. 12 is a block diagram illustrating a configuration example of a comparison unit in a photoelectric conversion device according to a second embodiment of the present invention.

A photoelectric conversion device according to a second embodiment of the present invention will be described with reference to FIG. 12. Components similar to those of the photoelectric conversion device according to the first embodiment are denoted by the same reference numerals, and description thereof will be omitted or simplified. FIG. 12 is a block diagram illustrating a configuration example of a comparison unit in the photoelectric conversion device according to the present embodiment.

The photoelectric conversion device according to the present embodiment is the same as the photoelectric conversion device according to the first embodiment except that the configuration of the comparison unit 341 is different. In the present embodiment, differences from the photoelectric conversion device according to the first embodiment will be mainly described, and description of the same portions as those of the photoelectric conversion device according to the first embodiment will be appropriately omitted.

In the first embodiment, the first threshold value used for the determination of the pixel saturation is fixed to 256 LSB (=Nsat/8). On the other hand, in the present embodiment, the first threshold value used for the determination of the pixel saturation may be selected from a plurality of preset threshold values. Here, as an example, a configuration in which the first threshold value is selected from 256 LSB (=Nsat/8), 512 LSB (=Nsat/4), and 1024 LSB (Nsat/2) will be described, but the value of the setting value prepared as the first threshold value and the number of the setting values may be appropriately changed.

As illustrated in FIG. 12, the comparison unit 341 of the photoelectric conversion device according to the present embodiment includes latch circuits LC11, LC12, LC13, and LC2, and a multiplexer MUX. A count value is input from the counting unit 32 to each of the latch circuits LC11, LC12, LC13, and LC2. The latch circuits LC11, LC12, and LC13 are connected to the multiplexer MUX. The multiplexer MUX is connected to the storage unit 343. The latch circuit LC2 is connected to the OR circuit LG5.

The comparison unit 341 compares the count value acquired from the counting unit 32 with the threshold values set in the latch circuits LC11, LC12, and LC13, and when the acquired count value is equal to or greater than the set threshold value, causes the corresponding latch circuit to hold a high-level signal. That is, when the count value is equal to or greater than 256 LSB (=Nsat/8), a high-level signal is held in the latch circuit LC11. When the count value is equal to or greater than 512 LSB (=Nsat/4), a high-level signal is held in the latch circuit LC12. When the count value is equal to or greater than 1024 LSB (=Nsat/2), a high-level signal is held in the latch circuit LC13. The multiplexer MUX selects a latch circuit corresponding to a set value of the first threshold value from among the latch circuits LC11, LC12, and LC13 in accordance with a control signal supplied from the control circuit 80 via the setting signal line 22, and outputs a signal held by the selected latch circuit to the storage unit 343.

By employing the configuration of the present embodiment, the circuit size of the pixel 12 is larger than that of the first embodiment, but flexibility as a system may be increased.

As described above, according to the present embodiment, the occurrence of flicker may be effectively suppressed while the dynamic range is enlarged and the power consumption is reduced.

Third Embodiment

Figure 13:
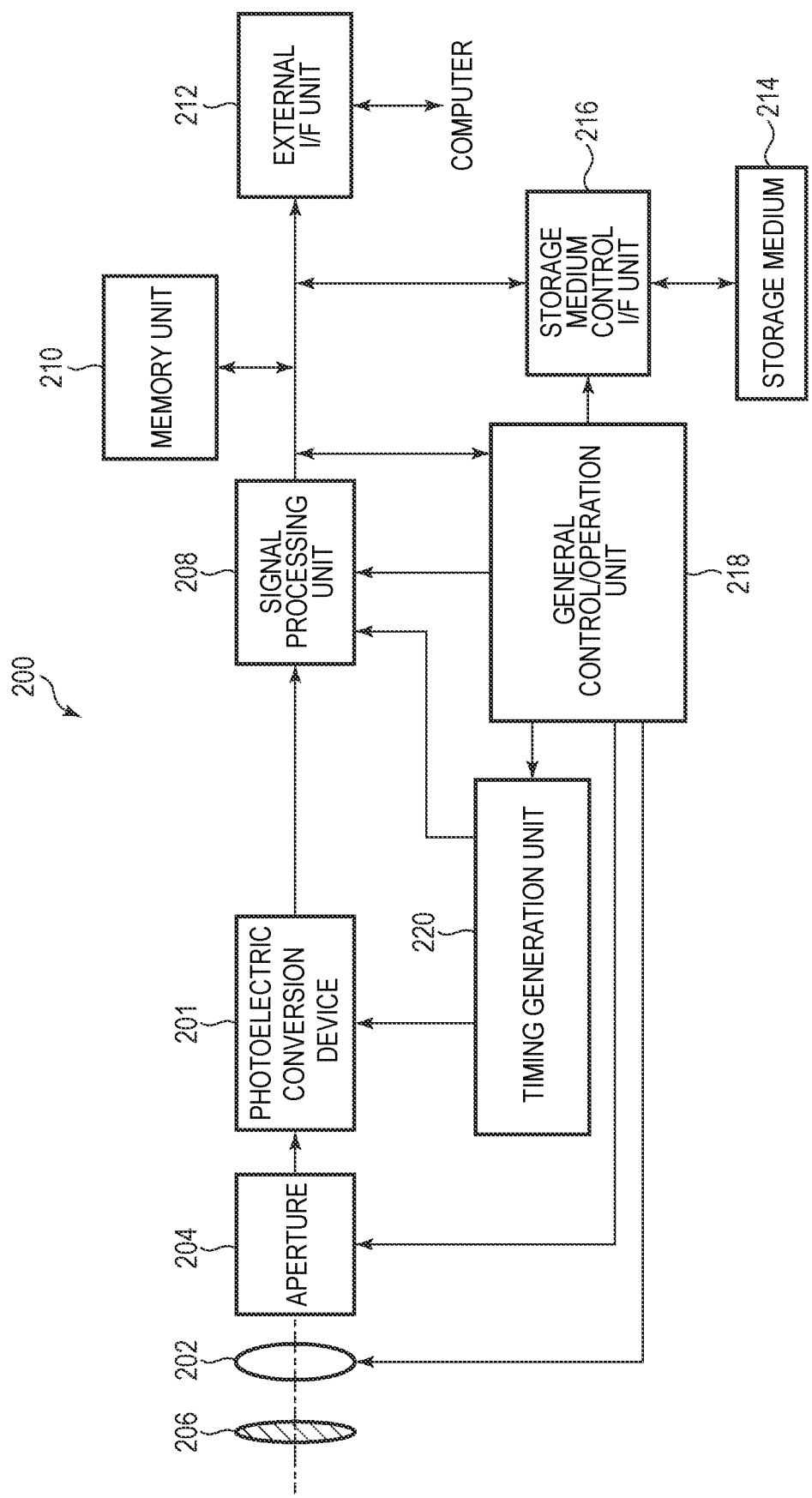
FIG. 13 is a block diagram illustrating a schematic configuration of a photodetection system according to a third embodiment of the present invention.

A photodetection system according to a third embodiment of the present invention will be described with reference to FIG. 13. FIG. 13 is a block diagram illustrating a schematic configuration of the photodetection system according to the present embodiment. In the present embodiment, a photodetection sensor to which the photoelectric conversion device 120 described in the first or second embodiment is applied will be described.

The photoelectric conversion device 120 described in the first and second embodiments may be applied to various photodetection systems. Examples of applicable photodetection systems include imaging systems such as digital still cameras, digital camcorders, surveillance cameras, copying machines, facsimiles, mobile phones, on-vehicle cameras, observation satellites, and the like. A camera module including an optical system such as a lens and an imaging device is also included in the photodetection system. FIG. 13 is a block diagram of a digital still camera as an example of these.

The photodetection system 200 illustrated in FIG. 13 includes a photoelectric conversion device 201, a lens 202 for forming an optical image of an object on the photoelectric conversion device 201, an aperture 204 for varying the amount of light passing through the lens 202, and a barrier 206 for protecting the lens 202. The lens 202 and the aperture 204 forms an optical system for focusing light on the photoelectric conversion device 201. The photoelectric conversion device 201 is the photoelectric conversion device 120 described in the first or second embodiment, and converts the optical image formed by the lens 202 into image data.

The photodetection system 200 also includes a signal processing unit 208 that processes an output signal output from the photoelectric conversion device 201. The signal processing unit 208 generates image data from the digital signal output from the photoelectric conversion device 201. The signal processing unit 208 performs various corrections and compressions as necessary and outputs the processed image data. The photoelectric conversion device 201 may include an AD conversion unit that generates a digital signal to be processed by the signal processing unit 208. The AD conversion unit may be formed on a semiconductor layer (semiconductor substrate) in which the photoelectric conversion element of the photoelectric conversion device 201 is formed, or may be formed on a semiconductor layer different from the semiconductor layer in which the photoelectric conversion element of the photoelectric conversion device 201 is formed. The signal processing unit 208 may be formed on the same semiconductor layer as the photoelectric conversion device 201.

The photodetection system 200 further includes a memory unit 210 for temporarily storing image data, and an external interface unit (external I/F unit) 212 for communicating with an external computer or the like. Further, the photodetection system 200 includes a storage medium 214 such as a semiconductor memory for storing or reading out captured image data, and a storage medium control interface unit (storage medium control I/F unit) 216 for storing or reading out image data on or from the storage medium 214. The storage medium 214 may be built in the photodetection system 200, or may be detachable. Further, communication between the storage medium control I/F unit 216 and the storage medium 214 and communication from the external I/F unit 212 may be performed wirelessly.

Further, the photodetection system 200 includes a general control/operation unit 218 that controls various calculations and controls the entire digital still camera, and a timing generation unit 220 that outputs various timing signals to the photoelectric conversion device 201 and the signal processing unit 208. Here, the timing signal or the like may be input from the outside, and the photodetection system 200 may include at least the photoelectric conversion device 201 and a signal processing unit 208 that processes the signal output from the photoelectric conversion device 201. The timing generation unit 220 may be mounted on the photoelectric conversion device 201. Further, the general control/operation unit 218 and the timing generation unit 220 may be configured to implement some or all of the control functions of the photoelectric conversion device 201.

The photoelectric conversion device 201 outputs an imaging signal to the signal processing unit 208. The signal processing unit 208 performs predetermined signal processing on the imaging signal output from the photoelectric conversion device 201, and outputs image data. The signal processing unit 208 generates an image using the imaging signal. The signal processing unit 208 may be configured to perform a distance measurement operation on a signal output from the photoelectric conversion device 201.

As described above, according to the present embodiment, by configuring the photodetection system using the photoelectric conversion device according to the first or second embodiment, it is possible to realize the photodetection system capable of obtaining a higher quality image.

Fourth Embodiment

Figure 14:
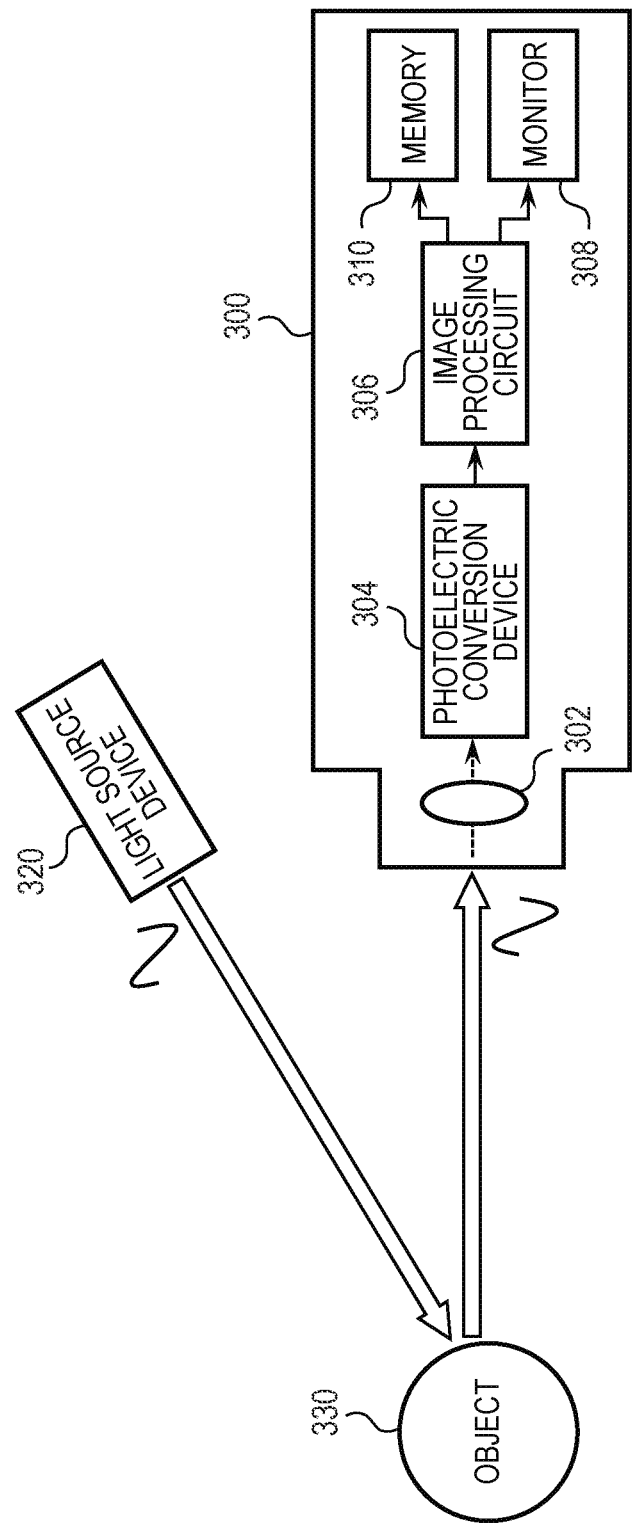
FIG. 14 is a block diagram illustrating a schematic configuration of a range image sensor according to a fourth embodiment of the present invention.

A range image sensor according to a fourth embodiment of the present invention will be described with reference to FIG. 14. FIG. 14 is a block diagram illustrating a schematic configuration of the range image sensor according to the present embodiment. In the present embodiment, a range image sensor will be described as an example of a photodetection system to which the photoelectric conversion device 120 described in the first or second embodiment is applied.

As illustrated in FIG. 14, the range image sensor 300 according to the present embodiment may include an optical system 302, a photoelectric conversion device 304, an image processing circuit 306, a monitor 308, and a memory 310. The range image sensor 300 receives light (modulated light or pulse light) emitted from the light source device 320 toward an object 330 and reflected by the surface of the object 330, and acquires a distance image corresponding to the distance to the object 330.

The optical system 302 includes one or a plurality of lenses, and has a role of forming an image of image light (incident light) from the object 330 on a light receiving surface (sensor unit) of the photoelectric conversion device 304.

The photoelectric conversion device 304 is the photoelectric conversion device 120 described in any of the first and second embodiments, and has a function of generating a distance signal indicating the distance to the object 330 based on the image light from the object 330 and supplying the generated distance signal to the image processing circuit 306.

The image processing circuit 306 has a function of performing image processing for constructing a distance image based on the distance signal supplied from the photoelectric conversion device 304.

The monitor 308 has a function of displaying a distance image (image data) obtained by image processing in the image processing circuit 306. The memory 310 has a function of storing (recording) a distance image (image data) obtained by image processing in the image processing circuit 306.

As described above, according to the present embodiment, by configuring the range image sensor using the photoelectric conversion device according to the first or second embodiment, it is possible to realize a range image sensor capable of acquiring a distance image including more accurate distance information in conjunction with improvement in characteristics of the pixel 12.

Fifth Embodiment

An endoscopic surgical system according to a fifth embodiment of the present invention will be described with reference to FIG. 15.

Figure 15:
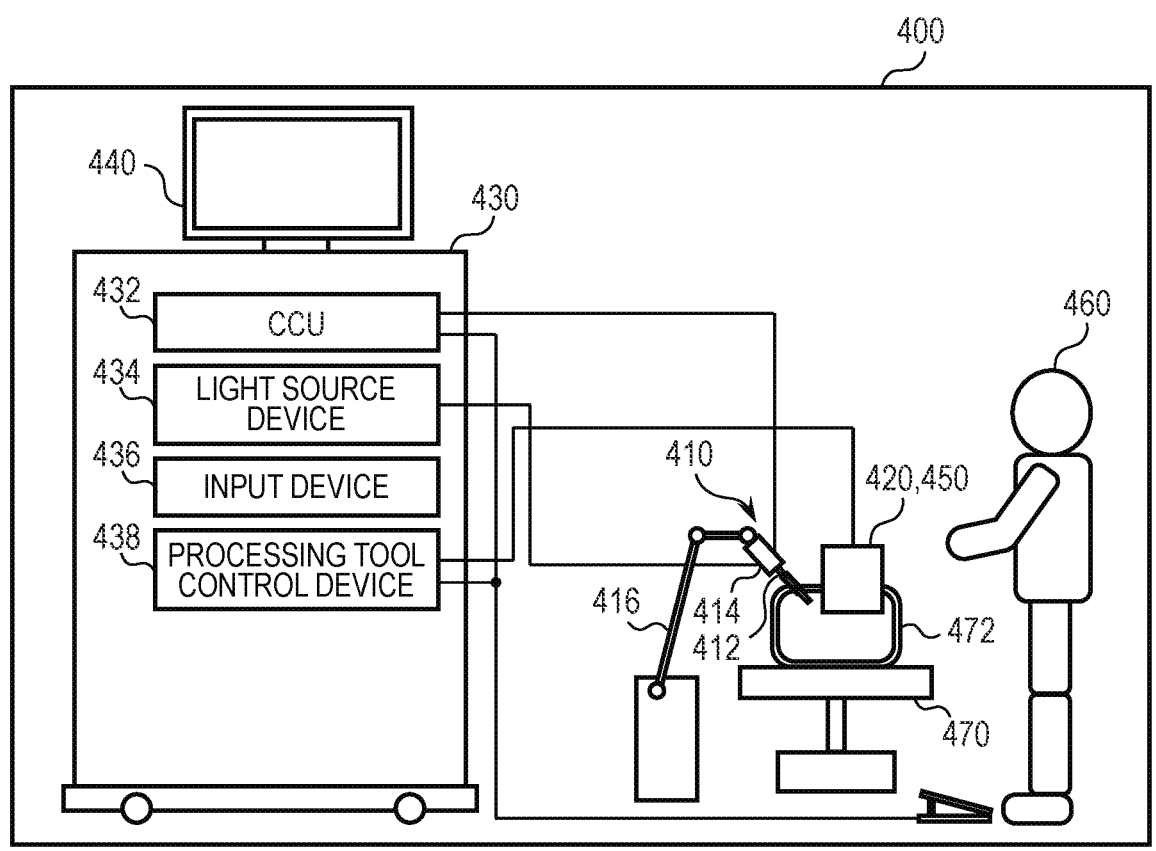
FIG. 15 is a schematic diagram illustrating a configuration example of an endoscopic surgical system according to a fifth embodiment of the present invention.

FIG. 15 is a schematic diagram illustrating a configuration example of the endoscopic surgical system according to the present embodiment. In the present embodiment, an endoscopic surgical system will be described as an example of a photodetection system to which the photoelectric conversion device 120 described in the first or second embodiment is applied.

FIG. 15 illustrates a state in which an operator (surgeon) 460 performs an operation on a patient 472 on a patient bed 470 using an endoscopic surgical system 400.

As illustrated in FIG. 15, the endoscopic surgical system 400 according to the present embodiment may include an endoscope 410, a surgical tool 420, and a cart 430 on which various devices for endoscopic surgery are mounted. The cart 430 may include a CCU (Camera Control Unit) 432, a light source device 434, an input device 436, a processing tool control device 438, a display device 440, and the like.

The endoscope 410 includes a lens barrel 412 in which an area of a predetermined length from the tip is inserted into the body cavity of the patient 472, and a camera head 414 connected to the base end of the lens barrel 412. Although FIG. 15 illustrates an endoscope 410 configured as a rigid mirror having a rigid lens barrel 412, the endoscope 410 may be configured as a flexible mirror having a flexible lens barrel. The endoscope 410 is held in a movable state by an arm 416.

An opening into which the objective lens is fitted is provided at the tip of the lens barrel 412. A light source device 434 is connected to the endoscope 410, and light generated by the light source device 434 is guided to the tip of the lens barrel 412 by a light guide extended inside the lens barrel 412, and is irradiated to an observation target in the body cavity of the patient 472 through an objective lens. The endoscope 410 may be a direct-viewing mirror, an oblique-viewing mirror, or a side-viewing mirror.

An optical system and a photoelectric conversion device (not illustrated) are provided inside the camera head 414, and reflected light (observation light) from the observation target is focused on the photoelectric conversion device by the optical system. The photoelectric conversion device photoelectrically converts the observation light and generates an electric signal corresponding to the observation light, i.e., an image signal corresponding to the observation image. As the photoelectric conversion device, the photoelectric conversion device 120 described in the first or second embodiment may be used. The image signal is transmitted to the CCU 432 as RAW data.

The CCU 432 may be configured by a CPU (Central Processing Unit), a GPU (Graphics Processing Unit), and the like, and integrally controls the operation of the endoscope 410 and the display device 440. Further, the CCU 432 receives the image signal from the camera head 414, and performs various types of image processing for displaying an image based on the image signal, such as development processing (demosaic processing), on the image signal.

The display device 440 displays an image based on the image signal subjected to the image processing by the CCU 432 under the control of the CCU 432.

The light source device 434 may be configured by, for example, a light source such as an LED (Light Emitting Diode), and supplies irradiation light to the endoscope 410 when photographing an image of a surgical part or the like.

The input device 436 is an input interface for the endoscopic surgical system 400.

The user may input various kinds of information and instructions to the endoscopic surgical system 400 via the input device 436.

The processing tool control device 438 controls the actuation of the energy processing tool 450 for tissue ablation, incision, blood vessel sealing, etc.

The light source device 434 for supplying the irradiation light to the endoscope 410 when photographing an image of the surgical part may be formed of a white light source configured by, for example, an LED, a laser light source, or a combination thereof. When a white light source is constituted by a combination of RGB laser light sources, since the output intensity and output timing of each color (each wavelength) may be controlled with high accuracy, the white balance of a captured image may be adjusted in the light source device 434. In this case, the observation object is irradiated with the laser light from each of the RGB laser light sources in a time division manner, and the driving of the imaging element of the camera head 414 is controlled in synchronization with the irradiation timing, whereby the images corresponding to the RGB light sources may be captured in a time division manner. According to this method, a color image may be obtained without providing a color filter in the imaging element.

Further, the driving of the light source device 434 may be controlled so as to change the intensity of the output light every predetermined time. By controlling the driving of the imaging element of the camera head 414 in synchronization with the timing of changing the intensity of the light to acquire an image in a time-division manner and compositing the image, it is possible to generate an image of a high dynamic range without so-called blacked up shadows and blown out highlights.

The light source device 434 may be configured to be capable of supplying light in a predetermined wavelength band corresponding to the special light observation. In the special light observation, for example, wavelength dependency of light absorption in body tissue is utilized. Specifically, predetermined tissues such as a blood vessel in the surface layer of the mucous is imaged with high contrast by irradiating light in a narrower band compared to the irradiation light (i.e., white light) during normal observation. Alternatively, in the special light observation, fluorescence observation for obtaining an image by fluorescence generated by irradiation with excitation light may be performed. In the fluorescence observation, the body tissue may be irradiated with excitation light to observe fluorescence from the body tissue, or a reagent such as indocyanine green (ICG) may be locally poured into the body tissue, and the body tissue may be irradiated with excitation light corresponding to the fluorescence wavelength of the reagent to obtain a fluorescence image. The light source device 434 may be configured to supply narrowband light and/or excitation light corresponding to such the special light observation.

As described above, according to the present embodiment, by configuring the endoscopic surgical system using the photoelectric conversion device according to the first or second embodiment, it is possible to realize an endoscopic surgical system capable of acquiring images of better quality.

Sixth Embodiment

Figure 16A:
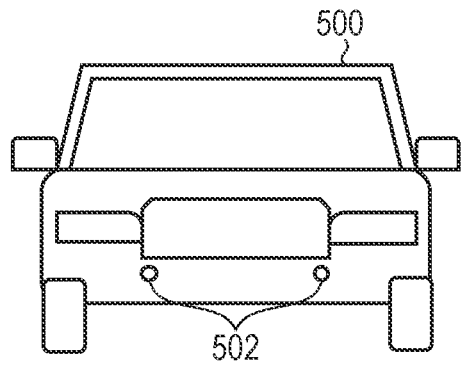
FIG. 16A, FIG. 16B, and FIG. 16C are schematic diagrams illustrating a configuration example of a movable object according to a sixth embodiment of the present invention.
Figure 16B:
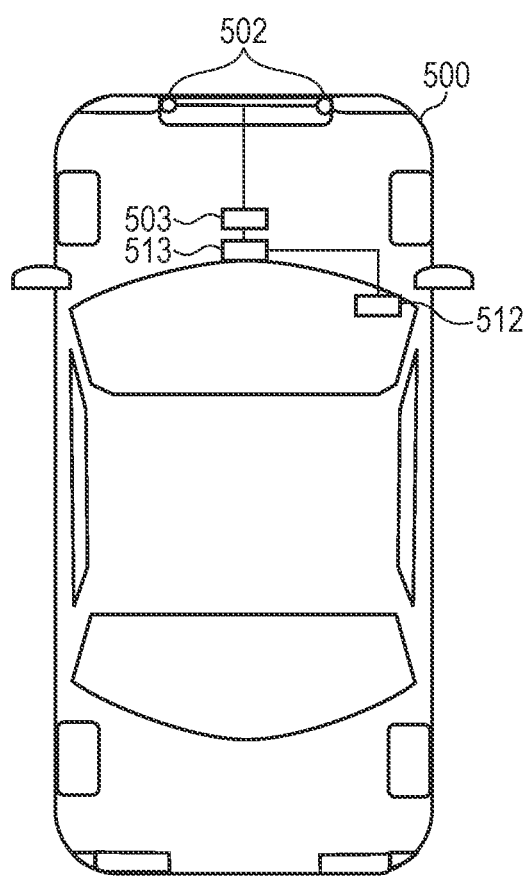
Figure 16C:
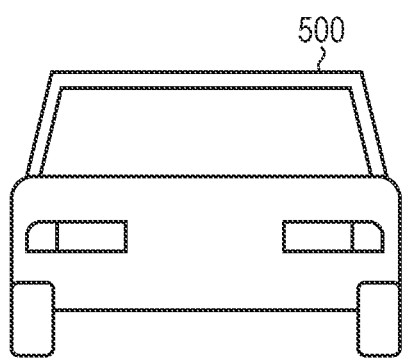
Figure 17:
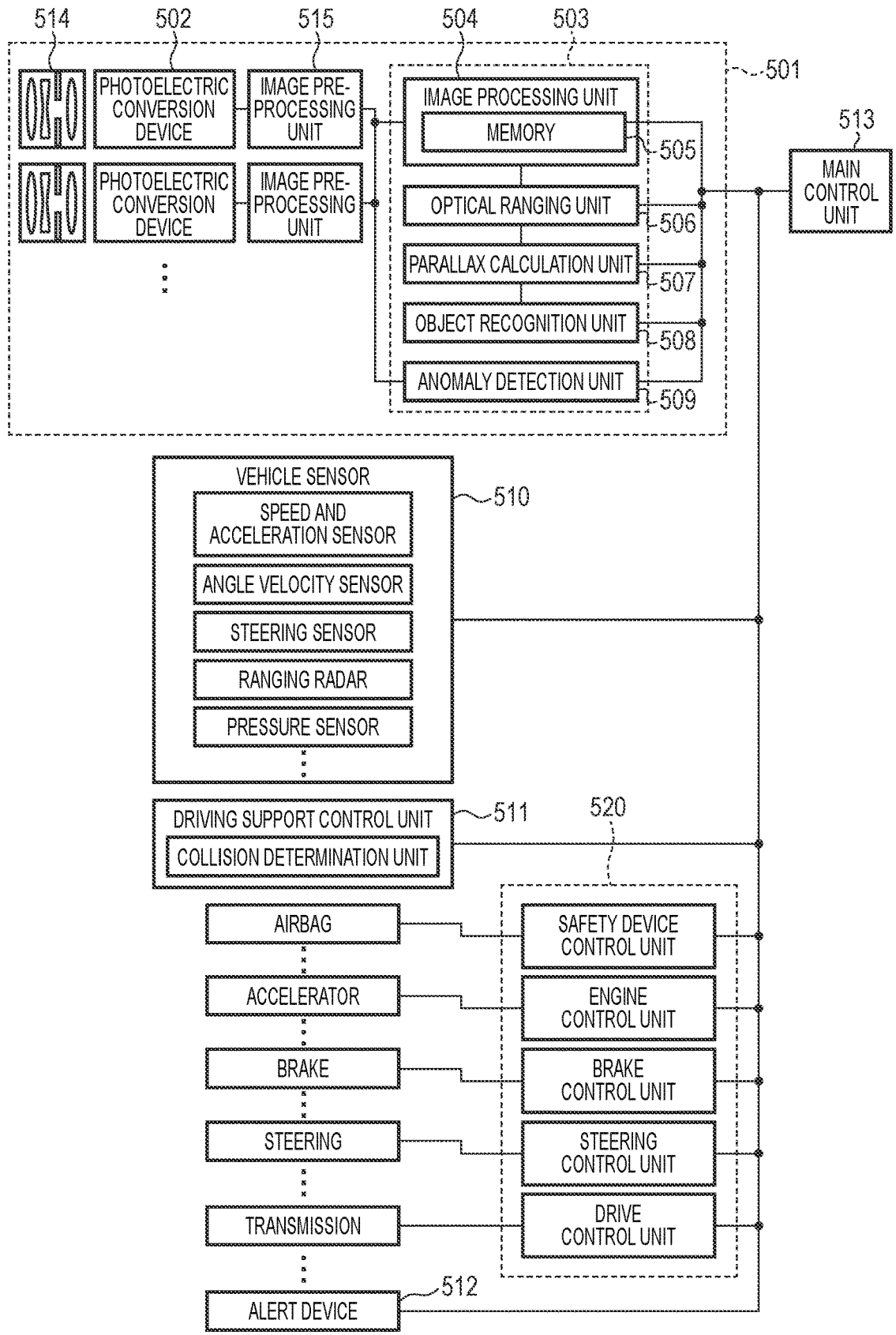
FIG. 17 is a block diagram illustrating a schematic configuration of a photodetection system according to the sixth embodiment of the present invention.
Figure 18:
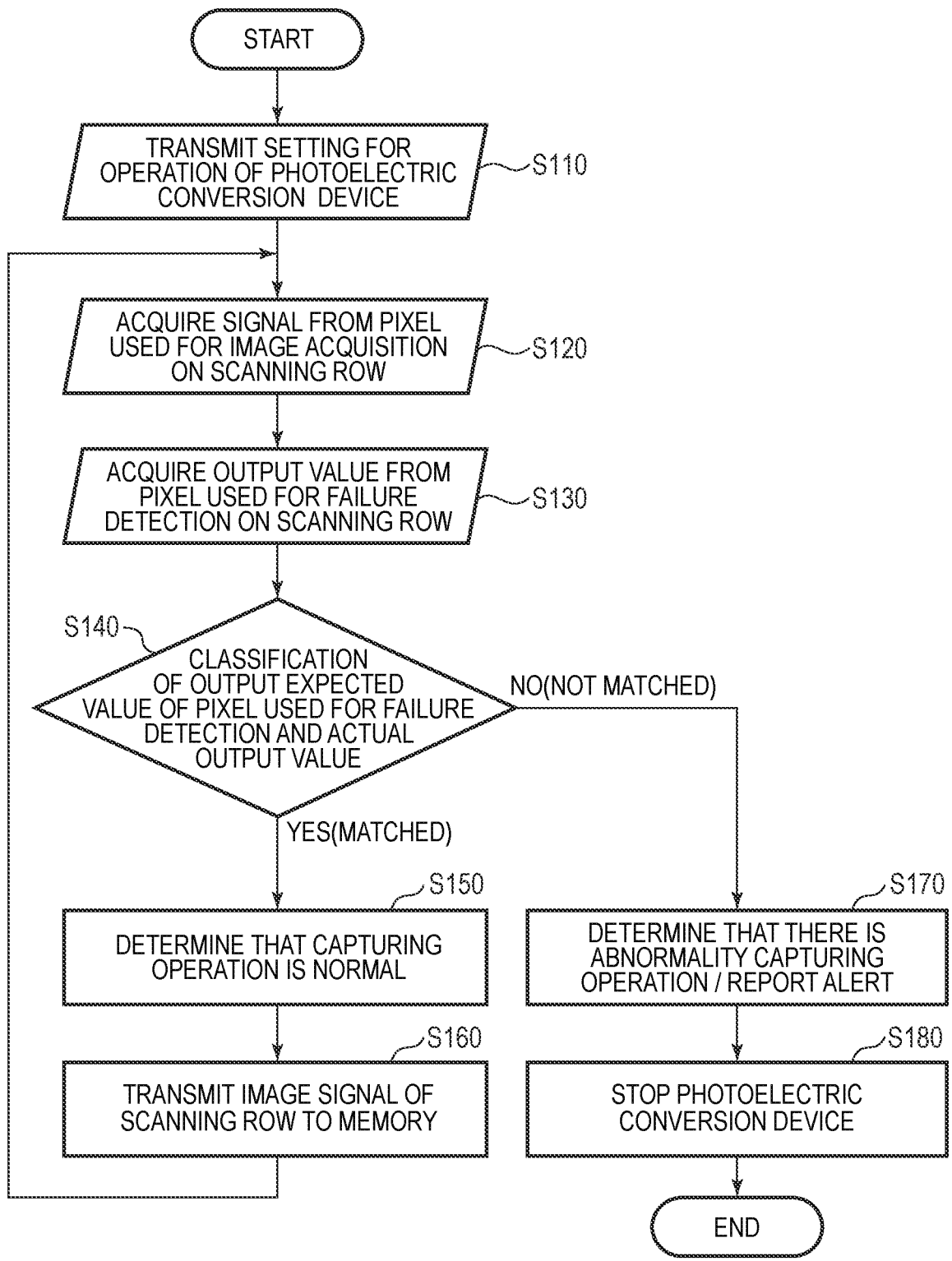
FIG. 18 is a flowchart illustrating an operation of the photodetection system according to the sixth embodiment of the present invention.

A photodetection system and movable object according to a sixth embodiment of the present invention will be described with reference to FIG. 16A to FIG. 18. FIG. 16A to FIG. 16C are schematic diagrams illustrating a configuration example of a movable object according to the present embodiment. FIG. 17 is a block diagram illustrating a schematic configuration of a photodetection system according to the present embodiment. FIG. 18 is a flowchart illustrating an operation of the photodetection system according to the present embodiment. In the present embodiment, an application example to an on-vehicle camera will be described as a photodetection system to which the photoelectric conversion device 120 described in the first or second embodiment is applied.

FIG. 16A to FIG. 16C are schematic diagrams illustrating a configuration example of a movable object (a vehicle system) according to the present embodiment. FIG. 16A to FIG. 16C illustrate a configuration of a vehicle 500 (automobile) as an example of a vehicle system incorporating a photodetection system to which the photoelectric conversion device 120 according to the first or second embodiment is applied. FIG. 16A is a schematic front view of the vehicle 500, FIG. 16B is a schematic plan view of the vehicle 500, and FIG. 16C is a schematic rear view of the vehicle 500. The vehicle 500 includes a pair of photoelectric conversion devices 502 on the front side thereof. Here, the photoelectric conversion device 502 is the photoelectric conversion device 120 described in the first or second embodiment. The vehicle 500 includes an integrated circuit 503, an alert device 512, and a main control unit 513.

FIG. 17 is a block diagram illustrating a configuration example of a photodetection system 501 mounted on the vehicle 500. The photodetection system 501 includes a photoelectric conversion device 502, an image preprocessing unit 515, an integrated circuit 503, and an optical system 514. The photoelectric conversion device 502 is the photoelectric conversion device 120 described in the first or second embodiment. The optical system 514 forms an optical image of an object on the photoelectric conversion device 502. The photoelectric conversion device 502 converts the optical image of the object formed by the optical system 514 into an electric signal. The image preprocessing unit 515 performs predetermined signal processing on the signal output from the photoelectric conversion device 502. The function of the image preprocessing unit 515 may be incorporated in the photoelectric conversion device 502. The photodetection system 501 is provided with at least two sets of the optical system 514, a photoelectric conversion device 502, and an image preprocessing unit 515, and outputs from the image preprocessing units 515 of each set are input to the integrated circuit 503.

The integrated circuit 503 is an integrated circuit for use in an imaging system, and includes an image processing unit 504, an optical ranging unit 506, a parallax calculation unit 507, an object recognition unit 508, and an abnormality detection unit 509. The image processing unit 504 processes the image signal output from the image preprocessing unit 515. For example, the image processing unit 504 performs image processing such as development processing and defect correction on the output signal of the image preprocessing unit 515. The image processing unit 504 includes a memory 505 for temporarily storing image signals. The memory 505 may store, for example, the position of a known defective pixel in the photoelectric conversion device 502.

The optical ranging unit 506 performs focusing and distance measurement of the object. The parallax calculation unit 507 calculates distance measurement information (distance information) from a plurality of image data (parallax images) acquired by the plurality of photoelectric conversion devices 502. Each of the photoelectric conversion devices 502 may have a configuration capable of acquiring various kinds of information such as distance information. The object recognition unit 508 recognizes an object such as a vehicle, a road, a marker, or a person.

When the abnormality detection unit 509 detects the abnormality of the photoelectric conversion device 502, the abnormality detection unit 509 notifies the main control unit 513 of the abnormality.

The integrated circuit 503 may be implemented by dedicated hardware, software modules, or a combination thereof. Further, it may be implemented by FPGA (Field Programmable Gate Array), ASIC (Application Specific Integrated Circuit), or the like, or may be implemented by a combination of these.

The main control unit 513 collectively controls the operations of the photodetection system 501, the vehicle sensor 510, the control unit 520, and the like. The vehicle 500 may not include the main control unit 513.

In this case, the photoelectric conversion device 502, the vehicle sensor 510, and the control unit 520 transmit and receive control signals via a communication network. For example, the CAN (Controller Area Network) standard may be applied to transmit and receive the control signals.

The integrated circuit 503 has a function of receiving a control signal from the main control unit 513 or transmitting a control signal and a setting value to the photoelectric conversion device 502 by its own control unit.

The photodetection system 501 is connected to a vehicle sensor 510, and may detect a traveling state of the host vehicle such as a vehicle speed, a yaw rate, a steering angle, and the like, an environment outside the own vehicle, and states of other vehicles and obstacles.

The vehicle sensor 510 is also distance information acquisition means for acquiring distance information to the object. The photodetection system 501 is connected to a driving support control unit 511 that performs various driving support functions such as an automatic steering function, an automatic circling function, and a collision prevention function. In particular, with regard to the collision determination function, based on the detection results of the photodetection system 501 and the vehicle sensor 510, it is determined whether or not there is a collision with another vehicle or an obstacle. Thus, avoidance control when a collision is estimated and activation of the safety device at the time of collision are performed.

The photodetection system 501 is also connected to the alert device 512 that issues an alarm to the driver based on the determination result of the collision determination unit. For example, when the collision possibility is high as the determination result of the collision determination unit, the main control unit 513 performs vehicle control to avoid collision and reduce damage by braking, returning an accelerator, suppressing engine output, or the like. The alert device 512 alerts a user by sounding an alarm such as a sound, displaying alert information on a display screen of a car navigation system or a meter panel, or applying vibration to a seat belt or a steering wheel.

In the present embodiment, the photodetection system 501 images the periphery of the vehicle, for example, the front side or the rear side. FIG. 16B illustrates an example of the arrangement of the photodetection system 501 when the photodetection system 501 captures an image in front of the vehicle.

As described above, the photoelectric conversion device 502 is disposed in front of the vehicle 500. More specifically, when a center line with respect to a forward/backward direction of the vehicle 500 or an outer shape (e.g., a vehicle width) is regarded as a symmetry axis, and two photoelectric conversion devices 502 are disposed axisymmetrically with respect to the symmetry axis, it is preferable to acquire distance information between the vehicle 500 and an object to be imaged and to determine a collision possibility. Further, it is preferable that the photoelectric conversion device 502 is disposed so as not to obstruct the field of view of the driver when the driver sees a situation outside the vehicle 500 from the driver's seat. The alert device 512 is preferably arranged to be easy to enter the field of view of the driver.

Next, a failure detection operation of the photoelectric conversion device 502 in the photodetection system 501 will be described with reference to FIG. 18. The failure detection operation of the photoelectric conversion device 502 may be performed according to steps S110 to S180 illustrated in FIG. 18.

Step S110 is a step of performing setting at the time of startup of the photoelectric conversion device 502. That is, a setting for the operation of the photoelectric conversion device 502 is transmitted from the outside of the photodetection system 501 (for example, the main control unit 513) or from the inside of the photodetection system 501, and the imaging operation and the failure detection operation of the photoelectric conversion device 502 are started.

Next, in step S120, pixel signals are acquired from the effective pixels. In step S130, an output value from the failure detection pixel provided for failure detection is acquired. The failure detection pixel includes a photoelectric conversion element as in the case of the effective pixel. A predetermined voltage is written to the photoelectric conversion element. The failure detection pixel outputs a signal corresponding to the voltage written to the photoelectric conversion element. Step S120 and step S130 may be reversed.

Next, in step S140, a classification of the expected output value of the failure detection pixel and the actual output value from the failure detection pixel is performed. As a result of the classification in step S140, when the expected output value matches the actual output value, the process proceeds to step S150, it is determined that the imaging operation is normally performed, and the process proceeds to step S160. In step S160, the pixel signals of the scanning row are transmitted to the memory 505 to temporarily store them. After that, the process returns to step S120 to continue the failure detection operation. On the other hand, as a result of the classification in step S140, when the expected output value does not match the actual output value, the processing step proceeds to step S170. In step S170, it is determined that there is an abnormality in the imaging operation, and an alert is notified to the main control unit 513 or the alert device 512. The alert device 512 causes the display unit to display that an abnormality has been detected. Thereafter, in step S180, the photoelectric conversion device 502 is stopped, and the operation of the photodetection system 501 is terminated.

Although the present embodiment exemplifies the example in which the flowchart is looped for each row, the flowchart may be looped for each plurality of rows, or the failure detection operation may be performed for each frame. The alert of step S170 may be notified to the outside of the vehicle via the wireless network.

Further, in the present embodiment, the control in which the own vehicle does not collide with other vehicles has been described, but the present invention is also applicable to a control in which the own vehicle is automatically driven following the other vehicles, a control in which the own vehicle is automatically driven so as not to go out of the lane, and the like. Further, the photodetection system 501 may be applied not only to a vehicle such as an own vehicle but also to, for example, other movable object (moving device) such as a ship, an aircraft, or an industrial robot. In addition, the present invention may be widely applied not only to a movable object, but also to equipment using object recognition, such as an ITS (Intelligent Transport Systems).

Seventh Embodiment

Figure 19A:
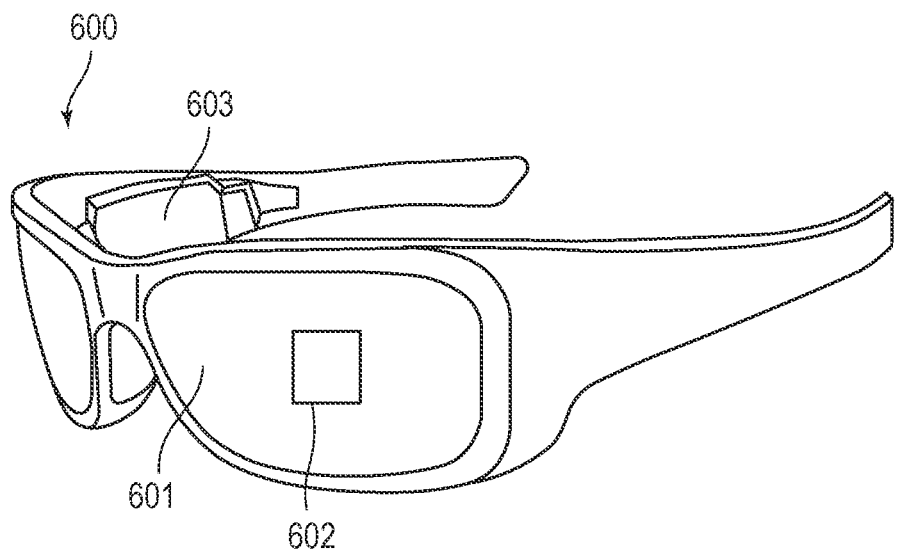
FIG. 19A and FIG. 19B are schematic diagrams illustrating a schematic configuration of a photodetection system according to a seventh embodiment of the present invention.
Figure 19B:
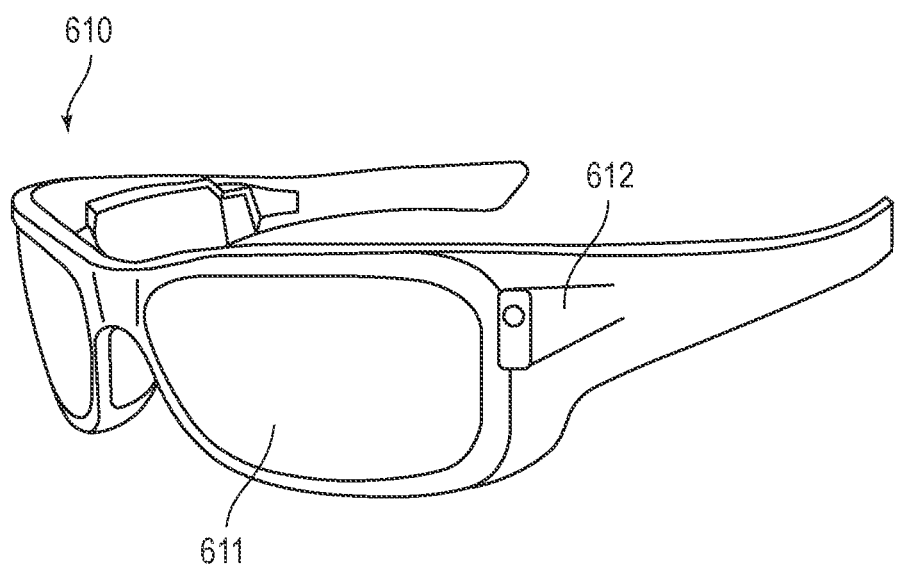

A photodetection system according to a seventh embodiment of the present invention will be described with reference to FIG. 19A and FIG. 19B. FIG. 19A and FIG. 19B are schematic diagrams illustrating a configuration example of a photodetection system according to the present embodiment. In the present embodiment, an application example to eyeglasses (smartglasses) will be described as a photodetection system to which the photoelectric conversion device 120 described in the first or second embodiment is applied.

FIG. 19A illustrates eyeglasses 600 (smartglasses) according to one application example. The eyeglasses 600 include a lens 601, a photoelectric conversion device 602, and a control device 603.

The photoelectric conversion device 602 is the photoelectric conversion device 120 described in the first or second embodiment, and is provided on the lens 601. One photoelectric conversion device 602 or a plurality of photoelectric conversion devices 602 may be provided on the lens 601. When the plurality of photoelectric conversion devices 602 are used, a plurality of types of photoelectric conversion devices 602 may be used in combination. The arrangement position of the photoelectric conversion device 602 is not limited to that illustrated in FIG. 19A. A display device (not illustrated) including a light emitting device such as an OLED (Organic Light Emitting Diode) or an LED (Light Emitting Diode) may be provided on the rear surface side of the lens 601.

The control device 603 functions as a power supply for supplying power to the photoelectric conversion device 602 and the display device. The control device 603 has a function of controlling the operation of the photoelectric conversion device 602 and the display device. The lens 601 is provided with an optical system for focusing light on the photoelectric conversion device 602.

FIG. 19B illustrates eyeglasses 610 (smartglasses) according to another application example. The eyeglasses 610 include lenses 611 and a control device 612. A photoelectric conversion device corresponding to the photoelectric conversion device 602 and a display device (not illustrated) may be mounted on the control device 612.

The lens 611 is provided with a photoelectric conversion device in the control device 612 and an optical system for projecting light from the display device, and an image is projected thereon. The control device 612 functions as a power supply for supplying power to the photoelectric conversion device and the display device, and has a function of controlling the operation of the photoelectric conversion device and the display device.

The control device 612 may further include a line-of-sight detection unit that detects the line of sight of the wearer. In this case, an infrared light emitting unit is provided in the control device 612, and infrared light emitted from the infrared light emitting unit may be used for detection of a line of sight. Specifically, the infrared light emitting unit emits infrared light to the eyeball of the user who is watching the display image. The reflected light of the emitted infrared light from the eyeball is detected by the imaging unit having the light receiving element, whereby a captured image of the eyeball is obtained. By providing a reduction unit that reduces light from the infrared light emitting unit to the display unit in a plan view, a decrease in image quality may be reduced.

The line of sight of the user with respect to the display image may be detected from the captured image of the eyeball obtained by capturing the infrared light. Any known method can be applied to the line-of-sight detection using the captured image of the eyeball. As an example, a line-of-sight detection method based on a Purkinje image caused by reflection of irradiation light on the cornea may be used. More specifically, a line-of-sight detection processing based on the pupil cornea reflection method is performed. By using the pupil cornea reflection method, a line-of-sight vector representing the direction (rotation angle) of the eyeball is calculated based on the image of the pupil image and the Purkinje image included in the captured image of the eyeball, whereby the line of sight of the user is detected.

The display device of the present embodiment may include a photoelectric conversion device having a light receiving element, and may be configured to control a display image based on line-of-sight information of a user from the photoelectric conversion device. Specifically, the display device determines a first viewing area to be gazed by the user and a second viewing area other than the first viewing area based on the line-of-sight information. The first viewing area and the second viewing area may be determined by a control device of the display device, or may be determined by an external control device. When an external control device determines, the determination result is transmitted to a display device via communication. In the display region of the display device, the display resolution of the first viewing area may be controlled to be higher than the display resolution of the second viewing area. That is, the resolution of the second viewing area may be lower than the resolution of the first viewing area.

Further, the display area may have a first display area and a second display area different from the first display area, and may be configured to determine an area having a high priority from the first display area and the second display area based on the line-of-sight information. The first display area and the second display area may be determined by a control device of the display device, or may be determined by an external control device. When an external control device determines, the determination result is transmitted to the display device via communication. The resolution of the region with high priority may be controlled to be higher than the resolution of the region other than the region with high priority. That is, the resolution of an area having a relatively low priority may be reduced.

The AI (Artificial Intelligence) may be used to determine the first viewing area or the area with high priority. The AI may be a model configured to estimate an angle of a line of sight and a distance to a target object ahead of the line of sight from an image of an eyeball, using an image of the eyeball and a direction in which the eyeball of the image is actually viewed as teacher data. The AI program may be held by the display device, the photoelectric conversion device, or an external device. When the external device has, the information is transmitted to the display device via communication.

When the display control is performed based on the visual recognition detection, the present invention may be preferably applied to smartglasses which further include a photoelectric conversion device for capturing an image of the outside. The smartglasses may display captured external information in real time.

Modified Embodiments

The present invention is not limited to the above-described embodiments, and various modifications are possible.

For example, an example in which some of the configurations of any of the embodiments are added to other embodiments or an example in which some of the configurations of any of the embodiments are substituted with some of the configurations of the other embodiments is also an embodiment of the present invention.

Further, in the above-described embodiments, the count value is acquired from the counting unit 32 at the timings of the times T0, T1, and T2, but the number of times of acquiring the count value from the counting unit 32 during one accumulation period is not limited to three, and may be 2 or may be 4 or more.

Further, in the above-described embodiments, although the recharging method in which the photoelectric conversion element PD is periodically recharged is applied to the photoelectric conversion unit 30, the recharging method is not necessarily applied to the photoelectric conversion unit 30. For example, the switch unit MP driven by a periodic signal may be replaced with a resistor or an active quenching circuit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that any of the above-described embodiments is merely an example of an embodiment for carrying out the present invention, and the technical scope of the present invention should not be construed as being limited thereto. That is, the present invention can be implemented in various forms without departing from the technical idea or the main features thereof.

According to the present invention, occurrence of flicker may be effectively suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2023-071302, filed Apr. 25, 2023, which is hereby incorporated by reference herein in its entirety.

What is claimed is:

1. A photoelectric conversion device comprising:
a photoelectric conversion unit configured to output a photon detection signal in response to an incidence of a photon;
a counting unit configured to count the photon detection signal output from the photoelectric conversion unit; and
a counting control unit configured to control a counting operation in the counting unit,
wherein the counting control unit is configured to reset a count value and restart the counting operation from an initial value, when a count value from a start of the counting operation to a first time is less than a first threshold value and a count value from the start of the counting operation to a second time after the first time is equal to or greater than a second threshold value greater than the first threshold value.

2. The photoelectric conversion device according to claim 1, wherein the counting control unit is configured to stop the counting operation, when the count value up to the first time is equal to or greater than the first threshold value, the count value up to the second time is equal to or greater than the first threshold value, or the count value up to the first time is less than the first threshold value and the count value up to the second time is equal to or greater than the first threshold value and less than the second threshold value.

3. The photoelectric conversion device according to claim 1, wherein the counting control unit is configured to continue the counting operation, when the count value up to the second time is less than the first threshold value.

4. The photoelectric conversion device according to claim 3, wherein the counting control unit is configured to reset the count value and restart the counting operation from the initial value, when a count value from the start of the counting operation to a third time after the second time is equal to or greater than the second threshold value.

5. The photoelectric conversion device according to claim 3, wherein the counting control unit is configured to stop the counting operation, when a count value from the start of the counting operation to a third time after the second time is equal to or greater than the first threshold value and less than the second threshold value.

6. The photoelectric conversion device according to claim 1, wherein the counting control unit is configured to stop the counting operation, when the count value reaches a count upper limit value of the counting unit.

7. A photoelectric conversion device comprising:
a photoelectric conversion unit configured to output a photon detection signal in response to an incidence of a photon;
a counting unit configured to count the photon detection signal output from the photoelectric conversion unit; and
a counting control unit configured to control a counting operation in the counting unit,
wherein the counting control unit includes
a first memory configured to hold a result of comparison between a count value from a start of the counting operation to a first time and a first threshold value,
a second memory configured to hold a result of comparison between a count value from the start of the counting operation to a second time after the first time and the first threshold value, and
a third memory configured to hold a result of comparison between a count value from the start of the counting operation to the second time and a second threshold value greater than the first threshold value, and
wherein the counting control unit is configured to control the counting operation based on information held in the first memory, the second memory, and the third memory.

8. The photoelectric conversion device according to claim 7, wherein the counting control unit is configured to perform any one of continuation of the counting operation, stop of the counting operation, and restart of the counting operation, based on the information held in the first memory, the second memory, and the third memory.

9. The photoelectric conversion device according to claim 7, wherein the counting control unit is configured to reset the count value and restart the counting operation from an initial value, when the first memory indicates that the count value up to the first time is less than the first threshold value, the second memory indicates that the count value up to the second time is equal to or greater than the first threshold value and the third memory indicates that the count value up to the second time is equal to or greater than the second threshold value.

10. The photoelectric conversion device according to claim 7, wherein the counting control unit is configured to continue the counting operation, when the first memory indicates that the count value up to the first time is less than the first threshold value and the second memory indicates that the count value up to the second time is less than the first threshold value.

11. The photoelectric conversion device according to claim 10,
wherein the counting control unit further includes
a fourth memory configured to hold a comparison result between a count value from the start of the counting operation to a third time after the second time and the first threshold value, and
a fifth memory configured to hold a comparison result between the count value from the start of the counting operation to the third time and the second threshold value, and
wherein the counting control unit is configured to reset the count value and restart the counting operation from an initial value, when the fourth memory indicates that the count value up to the third time is equal to or greater than the first threshold value and the fifth memory indicates that the count value up to the third time is equal to or greater than the second threshold value.

12. The photoelectric conversion device according to claim 7, wherein the counting control unit is configured to stop the counting operation, when the first memory indicates that the count value up to the first time is equal to or greater than the first threshold value or when the second memory indicates that the count value up to the second time is equal to or greater than the first threshold value.

13. The photoelectric conversion device according to claim 7, wherein the counting control unit is configured to stop the counting operation regardless of information held in the first memory, the second memory and the third memory, when the count value reaches a count upper limit value of the counting unit.

14. The photoelectric conversion device according to claim 1,
wherein the photoelectric conversion unit includes an avalanche photodiode, and a control circuit configured to periodically control the avalanche photodiode to a standby state in which avalanche multiplication is possible and a recharging state that returns to a state in which avalanche multiplication is again possible after avalanche multiplication is caused in accordance with a periodic signal, and
wherein the counting unit is configured to count the number of periods in which the photon detection signal is output in correspondence with an occurrence of the avalanche multiplication out of periods in which the avalanche photodiode is in the standby state.

15. The photoelectric conversion device according to claim 1 comprising: a plurality of pixels each including the photoelectric conversion unit, the counting unit, and the counting control unit.

16. A photodetection system comprising:
the photoelectric conversion device according to claim 1; and
a signal processing device configured to process a signal output from the photoelectric conversion device.

17. The photodetection system according to claim 16, wherein the signal processing device generates a distance image representing distance information to an object based on the signal.

18. A movable object comprising:
the photoelectric conversion device according to claim 1;
a distance information acquisition unit configured to acquire distance information to an object from a parallax image based on a signal output from the photoelectric conversion device; and a control unit configured to control the movable object based on the distance information.

* * * * *